United States Patent
Xue et al.

(10) Patent No.: US 10,257,802 B2
(45) Date of Patent: Apr. 9, 2019

(54) BINDING REGISTRATION METHOD, DATA FORWARDING METHOD, RELATED DEVICE, AND NETWORK SYSTEM

(71) Applicants: Huawei Technologies Co., Ltd., Shenzhen (CN); University of Science and Technology of China, Hefei (CN)

(72) Inventors: Kaiping Xue, Hefei (CN); Yizhen Wu, Hefei (CN); Dan Ni, Hefei (CN); Fang Yu, Beijing (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 159 days.

(21) Appl. No.: 15/360,831

(22) Filed: Nov. 23, 2016

(65) Prior Publication Data

US 2017/0079000 A1 Mar. 16, 2017

Related U.S. Application Data

(63) Continuation of application No. PCT/CN2014/078310, filed on May 23, 2014.

(51) Int. Cl.
*H04W 8/06* (2009.01)
*H04W 60/04* (2009.01)
(Continued)

(52) U.S. Cl.
CPC .......... *H04W 60/04* (2013.01); *H04L 12/4633* (2013.01); *H04L 61/2038* (2013.01);
(Continued)

(58) Field of Classification Search
CPC ....... H04W 60/04; H04W 8/06; H04W 8/082; H04W 8/10; H04W 40/00; H04L 12/4633; H04L 61/2038; H04L 61/305
See application file for complete search history.

(56) References Cited

U.S. PATENT DOCUMENTS

| 8,681,739 B1 * | 3/2014 | Zhao | H04W 76/15 370/331 |
| 2010/0035578 A1 * | 2/2010 | Ahmed | H04W 12/06 455/411 |

(Continued)

FOREIGN PATENT DOCUMENTS

| CN | 101848454 A | 9/2010 |
| CN | 101902792 A | 12/2010 |

OTHER PUBLICATIONS

Liu et al., "Mobility Support in Software Defined Networking draft-liu-sdn-mobility-00," Informational, Internet-Draft, Network Working Group (Jul. 8, 2013).

(Continued)

*Primary Examiner* — Kevin D Mew
(74) *Attorney, Agent, or Firm* — Leydig, Voit & Mayer, Ltd.

(57) ABSTRACT

A binding registration method includes: an SDN controller receiving a first bearer message that is forwarded by a first MAG in multiple MAGs and that carries a first L2 attach request message; sending, to each of the first MAG and an LMA, a message for establishing a tunnel between the first MAG and the LMA; sending, to each of the first MAG and the LMA, a message for adjusting a flow entry of an MN; configuring an HNP(s) for the MN, and encapsulating the HNP(s) into an RA message; and sending the RA message to the first MAG.

20 Claims, 10 Drawing Sheets

(51) Int. Cl.
*H04L 12/46* (2006.01)
*H04L 29/12* (2006.01)
*H04W 8/10* (2009.01)
*H04W 8/08* (2009.01)
*H04W 40/00* (2009.01)

(52) U.S. Cl.
CPC ............. *H04W 8/06* (2013.01); *H04W 8/082* (2013.01); *H04W 8/10* (2013.01); *H04W 40/00* (2013.01); *H04L 61/305* (2013.01)

(56) References Cited

U.S. PATENT DOCUMENTS

| | | | | |
|---|---|---|---|---|
| 2010/0215019 A1* | 8/2010 | Velev | ...................... | H04W 8/06 370/331 |
| 2010/0250753 A1* | 9/2010 | Song | ................. | H04W 36/0011 709/227 |
| 2010/0323700 A1* | 12/2010 | Bachmann | ........ | H04W 36/0066 455/436 |
| 2011/0026453 A1* | 2/2011 | Yan | ....................... | H04W 8/082 370/328 |
| 2011/0103260 A1* | 5/2011 | Jeyatharan | .......... | H04W 60/005 370/254 |
| 2011/0261787 A1* | 10/2011 | Bachmann | ............ | H04L 63/029 370/331 |
| 2011/0292879 A1 | 12/2011 | Wang | | |
| 2012/0044949 A1* | 2/2012 | Velev | .................... | H04W 8/082 370/401 |
| 2012/0113937 A1* | 5/2012 | Aramoto | ............... | H04W 8/082 370/329 |
| 2012/0252481 A1* | 10/2012 | Anpat | ..................... | H04W 8/06 455/456.1 |
| 2014/0321328 A1* | 10/2014 | Zuniga | .................... | H04W 8/06 370/254 |
| 2015/0085740 A1* | 3/2015 | Kalapatapu | ........... | H04W 88/04 370/315 |
| 2015/0148036 A1* | 5/2015 | Grayson | ................. | H04W 8/06 455/435.1 |
| 2016/0014686 A1* | 1/2016 | Cho | ....................... | H04W 48/18 370/328 |
| 2016/0183156 A1* | 6/2016 | Chin | ................ | H04W 36/0022 370/331 |
| 2016/0374050 A1* | 12/2016 | Prasad | .................... | H04W 4/06 |
| 2017/0214452 A1* | 7/2017 | Fang | .................. | H04B 7/15507 |

OTHER PUBLICATIONS

Gudavelli et al., "Proxy Mobile IPv6," Request for Comments: 5213, Standards Track, Network Working Group (Aug. 2008).

Raza et al., "Leveraging PMIPv6 with SDN," ICUIMC'14 Proceedings of the 8th International Conference on Ubiquitous Information Management, ACM, New York, New York (Jan. 9-11, 2014).

Gundavelli et al., "Proxy Mobile IPv6," Request for Comments: 5213, Standards Track, Network Working Group (Aug. 2008).

* cited by examiner

BINDING REGISTRATION METHOD, DATA FORWARDING METHOD, RELATED DEVICE, AND NETWORK SYSTEM

CROSS-REFERENCE TO RELATED APPLICATIONS

This application is a continuation of International Application No. PCT/CN2014/078310, filed on May 23, 2014, the disclosure of which is hereby incorporated by reference in its entirety.

STATEMENT OF JOINT RESEARCH AGREEMENT

The subject matter and the claimed invention were made by or on the behalf of University of Science and Technology of China, of No. 96, JinZhai Road, Baohe District, Hefei City, Anhui Province, P.R. China and Huawei Technologies Co., Ltd., of Shenzhen, Guangdong Province, P.R. China, under a joint research agreement titled "Research and Development of Next Generation Video Coding Standards and Technologies". The joint research agreement was in effect on or before the claimed invention was made, and that the claimed invention was made as a result of activities undertaken within the scope of the joint research agreement.

TECHNICAL FIELD

The present invention relates to the communications field, and in particular, to a binding registration method, a data forwarding method, a related device, and a network system.

BACKGROUND

The Proxy Mobile IPv6 protocol provides network side-based mobility management support for a mobile node (MN), and does not require participation of the mobile node in signaling interworking related to mobility management, so that a user-side protocol stack does not need to be complexly extended. In the Proxy Mobile IPv6 protocol, a network layer is extended by adding two core functional entities, which are a local mobility anchor (LMA) and a mobile access gateway (MAG). The LMA is responsible for maintaining a reachable status of the mobile node and allocating a home network prefix of the mobile node. The MAG is located on a link to which the mobile node is anchored, and performs mobility management in place of the mobile node and completes binding registration with the LMA in place of the mobile node.

In an existing PMIPv6 mobility management solution, when the mobile node performs initial access, the mobile node first requests to be attached to a network. The MAG to which the mobile node is currently anchored acquires a mobile node identification (MN-ID) of the mobile node, and then the MAG sends the LMA a Proxy Binding Update (PBU) message that carries the MN-ID. After receiving the PBU message, the LMA returns, to the MAG, a Proxy Binding Acknowledgement (PBA) that carries a home network prefix (HNP) of the mobile node, and then the LMA negotiates with the MAG to establish a bidirectional tunnel. Subsequently, the MAG announces, to the mobile node on an access link, a router advertisement (RA) message that carries the HNP(s) of the mobile node, to complete a binding registration process.

In the existing PMIPv6 mobility management solution, because the network element devices LMA and MAG perform plenty of signaling negotiation and interworking, control functions are very complex. Especially when the mobile node moves frequently, the LMA and different MAGs need to perform more frequent and complex signaling interworking. In addition, the network element devices LMA and MAG are applicable only to the Proxy Mobile IPv6 protocol, and if the protocol is changed, the network element devices accordingly need to be changed, causing a huge waste in network construction.

SUMMARY

Embodiments of the present invention provide a binding registration method, a data forwarding method, a related device, and a network system, which resolves a problem in the Proxy Mobile IPv6 protocol that because a network element device performs plenty of signaling negotiation and interworking, a control function is complex, and resolves a problem of a waste in network construction resulted from a change of the network element device that is caused by a protocol change.

A first aspect of the embodiments of the present invention provides a software defined networking SDN controller, including:
 a first receiving unit, configured to receive a first bearer message that is forwarded by a first MAG in multiple mobile access gateways MAGs and that carries a first data link layer L2 attach request message, so that a mobile node requests to register with a network, where the first L2 attach request message is sent by the mobile node to the first MAG to request to access the first MAG, and the first L2 attach request message includes an ID of the mobile node;
 a first sending unit, configured to send, to each of the first MAG and an LMA, a message for establishing a tunnel between the first MAG and the local mobility anchor LMA, to establish the tunnel between the first MAG and the LMA;
 a second sending unit, configured to send, to each of the first MAG and the LMA, a message for adjusting a flow entry of the mobile node;
 a configuration and encapsulation unit, configured to: when establishment of the tunnel between the first MAG and the LMA succeeds, configure HNP(s) for the mobile node, and encapsulate the HNP(s) into a router advertisement message; and
 a third sending unit, configured to send the router advertisement message to the first MAG, so that the mobile node is registered with the network when the mobile node receives the router advertisement message from the first MAG With reference to the first aspect of the embodiments of the present invention, in a first implementation manner of the first aspect, the first sending unit is configured to send a first establishment message to the first MAG, where the first establishment message is used to instruct the first MAG to establish a tunnel interface on the first MAG side, and the first establishment message includes configuration information for establishing the tunnel interface on the first MAG side;
 the first sending unit is further configured to send a second establishment message to the LMA, where the second establishment message is used to instruct the LMA to establish a tunnel interface on the LMA side, and the second establishment message includes configuration information for establishing the tunnel interface on the LMA side;

the second sending unit is configured to send a first adjustment message to the first MAG, where the first adjustment message is used to instruct the first MAG to add a first flow entry of the mobile node; and the second sending unit is further configured to send a second adjustment message to the LMA, where the second adjustment message is used to instruct the LMA to add a second flow entry of the mobile node.

With reference to the first implementation manner of the first aspect of the embodiments of the present invention, in a second implementation manner of the first aspect, the first flow entry is used to instruct the first MAG to forward data according to content of the first flow entry; and the second flow entry is used to instruct the LMA to forward data according to content of the second flow entry.

With reference to the second implementation manner of the first aspect of the embodiments of the present invention, in a third implementation manner of the first aspect, the content of the first flow entry includes: a first matching entry: a source address prefix is the HNP(s) of the mobile node; an operation corresponding to the first matching entry: forwarding through a first MAG-LMA tunnel interface; a second matching entry: a destination address prefix is the HNP(s) of the mobile node; and an operation corresponding to the second matching entry: forwarding to a mobile node interface link; and the content of the second flow entry includes: a third matching entry: a destination address prefix is the HNP(s) of the mobile node; and an operation corresponding to the third matching entry: forwarding through an LMA-first MAG tunnel interface.

With reference to the first aspect of the embodiments of the present invention, or the first implementation manner of the first aspect, or the second implementation manner of the first aspect, or the third implementation manner of the first aspect, in a fourth implementation manner of the first aspect, the SDN controller further includes:

a second receiving unit, configured to: when the mobile node needs to be switched from the first MAG to a second MAG in the multiple MAGs, receive a second bearer message that is forwarded by the second MAG and that carries a second L2 attach request message, so that the mobile node requests to register with the network, where the second L2 attach request message is sent by the mobile node to the second MAG to request to access the second MAG, and the second L2 attach request message includes the ID of the mobile node; where the first sending unit is further configured to send, to each of the second MAG and the LMA, a message for establishing a tunnel between the second MAG and the LMA, to establish the tunnel between the second MAG and the LMA;

the second sending unit is further configured to send, to each of the second MAG and the LMA, the message for adjusting a flow entry of the mobile node;

the configuration and encapsulation unit is further configured to: when establishment of the tunnel between the second MAG and the LMA succeeds, configure the HNP(s) for the mobile node, and encapsulate the HNP(s) into the router advertisement message; and the third sending unit is further configured to send the router advertisement message to the second MAG when establishment of the tunnel between the second MAG and the LMA succeeds, so that the mobile node is registered with the network when the mobile node receives the router advertisement message from the second MAG, where the router advertisement message includes the HNP(s) configured by the SDN controller for the mobile node.

With reference to the fourth implementation manner of the first aspect of the embodiments of the present invention, in a fifth implementation manner of the first aspect of the embodiments of the present invention, the first sending unit is configured to send a third establishment message to the second MAG, where the third establishment message is used to instruct the second MAG to establish a tunnel interface on the second MAG side, and the third establishment message includes configuration information for establishing the tunnel interface on the second MAG side;

the first sending unit is further configured to send a fourth establishment message to the LMA, where the fourth establishment message is used to instruct the LMA to establish a tunnel interface on the LMA side, and the fourth establishment message includes configuration information for establishing the tunnel interface on the LMA side;

the second sending unit is configured to send a third adjustment message to the second MAG, where the third adjustment message is used to instruct the second MAG to add a third flow entry of the mobile node; and the second sending unit is further configured to send a fourth adjustment message to the LMA, where the fourth adjustment message is used to instruct the LMA to add a fourth flow entry of the mobile node.

With reference to the fifth implementation manner of the first aspect of the embodiments of the present invention, in a sixth implementation manner of the first aspect of the embodiments of the present invention, the third flow entry is used to instruct the second MAG to forward data according to content of the third flow entry; and the fourth flow entry is used to instruct the LMA to forward data according to content of the fourth flow entry.

With reference to the sixth implementation manner of the first aspect of the embodiments of the present invention, in a seventh implementation manner of the first aspect of the embodiments of the present invention, the content of the third flow entry includes: a fourth matching entry: a source address prefix is the HNP(s) of the mobile node; an operation corresponding to the fourth matching entry: forwarding through a second MAG-LMA tunnel interface; a fifth matching entry: a destination address prefix is the HNP(s) of the mobile node; and an operation corresponding to the fifth matching entry: forwarding to the mobile node interface link; and the content of the fourth flow entry includes: a sixth matching entry: a destination address prefix is the HNP(s) of the mobile node; and an operation corresponding to the sixth matching entry: forwarding through an LMA-second MAG tunnel interface.

A second aspect of the embodiments of the present invention provides a mobile access gateway MAG, including:

a first receiving unit, configured to receive a data link layer L2 attach request message sent by a mobile node, where the L2 attach request message includes an ID of the mobile node;

a first forwarding unit, configured to: add the L2 attach request message to a bearer message, and forward the bearer message to a software defined networking SDN controller;

a second receiving unit, configured to receive a message that is sent by the SDN controller and for establishing a tunnel between the MAG and a local mobility anchor LMA;

an establishment unit, configured to complete establishment of the tunnel on the MAG side according to the message for establishing a tunnel between the MAG and the LMA; where the second receiving unit is further configured to receive a message that is sent by the SDN controller and for adjusting a flow entry of the mobile node;

an adjustment unit, configured to adjust, according to the message for adjusting a flow entry of the mobile node, a flow entry that is of the mobile node and stored in the MAG; and a second forwarding unit, configured to: when establishment of the tunnel between the MAG and the LMA succeeds, forward a router advertisement message received from the SDN controller to the mobile node, so that the mobile node is registered with a network, where the router advertisement message includes HNP(s) configured by the SDN controller for the mobile node.

With reference to the second aspect of the embodiments of the present invention, in a first implementation manner of the second aspect of the embodiments of the present invention, the second receiving unit is further configured to receive an establishment message and an adjustment message that are sent by the SDN controller;

the establishment unit is further configured to establish a tunnel interface on the MAG side according to the establishment message; and the adjustment unit is configured to add a first flow entry of the mobile node according to the adjustment message.

With reference to the first implementation manner of the second aspect of the embodiments of the present invention, in a second implementation manner of the second aspect of the embodiments of the present invention, content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to an mobile node interface link.

With reference to the first implementation manner of the second aspect of the embodiments of the present invention, or the second implementation manner of the second aspect, in a third implementation manner of the second aspect of the embodiments of the present invention, the MAG further includes:

a third receiving unit, configured to: after the mobile node is registered with the network, receive packet data sent by the mobile node;

a matching unit, configured to match a source address prefix included in the packet data with the first matching entry in the first flow entry in the MAG; and a third forwarding unit, configured to: when the matching unit successfully performs matching, forward the packet data to the LMA through the tunnel between the MAG and the LMA according to the first flow entry, so that the LMA forwards the packet data to the network.

A third aspect of the embodiments of the present invention provides a local mobility anchor LMA, including:

a first receiving unit, configured to: after a software defined networking SDN controller receives a bearer message sent by a mobile access gateway MAG, receive a message that is sent by the SDN controller and for establishing a tunnel between the MAG and the LMA, where the bearer message carries a data link layer L2 attach request message, the L2 attach request message is sent by a mobile node to the MAG to request to access the MAG, and the L2 attach request message includes an ID of the mobile node;

an establishment unit, configured to complete establishment of the tunnel on the LMA side according to the message for establishing a tunnel between the MAG and the LMA; where the first receiving unit is further configured to receive a message that is sent by the SDN controller and for adjusting a flow entry of the mobile node; and an adjustment unit, configured to adjust, according to the message for adjusting a flow entry of the mobile node, a flow entry that is of the mobile node and stored in the LMA.

With reference to the third aspect of the embodiments of the present invention, in a first implementation manner of the third aspect of the embodiments of the present invention, the first receiving unit is further configured to receive an establishment message and an adjustment message that are sent by the SDN controller; and the establishment unit is further configured to establish a tunnel interface on the LMA side according to the establishment message; and the adjustment unit is further configured to add a second flow entry of the mobile node according to the adjustment message.

With reference to the first implementation manner of the third aspect of the embodiments of the present invention, in a second implementation manner of the third aspect of the embodiments of the present invention, content of the second flow entry includes: a third matching entry: a destination address prefix is an HNP(s) of the mobile node; and an operation corresponding to the third matching entry: forwarding through an LMA-MAG tunnel interface.

With reference to the first implementation manner of the third aspect of the embodiments of the present invention, or the second implementation manner of the third aspect, in a third implementation manner of the third aspect of the embodiments of the present invention, the LMA further includes:

a second receiving unit, configured to receive packet data from a network after establishment of the tunnel between the MAG and the LMA succeeds and the mobile node receives a router advertisement message to register with the network;

a matching unit, configured to match a destination address prefix included in the packet data with the third matching entry in the second flow entry in the LMA; and a forwarding unit, configured to: when the matching unit successfully performs matching, forward the packet data to the MAG through the tunnel between the MAG and the LMA according to the second flow entry, so that the MAG forwards the packet data to the mobile node according to the first flow entry in the MAG With reference to the third implementation manner of the third aspect of the embodiments of the present invention, in a fourth implementation manner of the third aspect of the embodiments of the present invention, content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

A fourth aspect of the embodiments of the present invention provides a network system, including:
- a software defined networking SDN controller, a mobile node, a mobile access gateway MAG, and a local mobility anchor LMA; where
- the mobile node is configured to send a data link layer L2 attach request message to the MAG when the mobile node needs to access the MAG, where the L2 attach request message includes an ID of the mobile node;
- the MAG is configured to: add the received L2 attach request message to a bearer message, and forward the bearer message to the SDN controller;
- the SDN controller is configured to: send, to each of the MAG and the LMA, a message for establishing a tunnel between the MAG and the LMA, and send, to each of the MAG and the LMA, a message for adjusting a flow entry of the mobile node;
- the MAG is configured to: complete establishment of the tunnel on the MAG side according to the received message for establishing a tunnel between the MAG and the LMA, and adjust, according to the received message for adjusting a flow entry of the mobile node, a flow entry that is of the mobile node and stored in the MAG;
- the LMA is configured to: complete establishment of the tunnel on the LMA side according to the message for establishing a tunnel between the MAG and the LMA, and adjust, according to the message for adjusting a flow entry of the mobile node, a flow entry that is of the mobile node and stored in the LMA;
- the SDN controller is further configured to: after establishment of the tunnel between the MAG and the LMA succeeds, configure HNP(s) for the mobile node, encapsulate the HNP(s) into a router advertisement message, and send the router advertisement message to the MAG; and
- the mobile node is further configured to receive the router advertisement message forwarded by the MAG, to register with a network.

With reference to the fourth aspect of the embodiments of the present invention, in a first implementation manner of the fourth aspect of the embodiments of the present invention, the SDN controller is further configured to: send a first establishment message and a first adjustment message to the MAG, and send a second establishment message and a second adjustment message to the LMA;
- the MAG is configured to: establish a tunnel interface on the MAG side according to the received first establishment message, and add a first flow entry of the mobile node according to the first adjustment message; and
- the LMA is configured to: establish a tunnel interface on the LMA side according to the received second establishment message, and add a second flow entry of the mobile node according to the second adjustment message.

With reference to the first implementation manner of the fourth aspect of the embodiments of the present invention, in a second implementation manner of the fourth aspect of the embodiments of the present invention, content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link; and content of the second flow entry includes: a third matching entry: a destination address prefix is the HNP(s) of the mobile node; and an operation corresponding to the third matching entry: forwarding through an LMA-MAG tunnel interface.

With reference to the fourth aspect of the embodiments of the present invention, or the first implementation manner of the fourth aspect, or the second implementation manner of the fourth aspect, in a third implementation manner of the fourth aspect of the embodiments of the present invention, the mobile node is further configured to send packet data to the accessed MAG after the mobile node is registered with the network;
- the MAG is configured to: match a source address prefix included in the received packet data with the first matching entry in the first flow entry in the MAG, and if the matching succeeds, forward the packet data to the LMA through the tunnel between the MAG and the LMA according to the first flow entry; and
- the LMA is configured to forward the received packet data to the network.

With reference to the fourth aspect of the embodiments of the present invention, or the first implementation manner of the fourth aspect, or the second implementation manner of the fourth aspect, in a fourth implementation manner of the fourth aspect of the embodiments of the present invention, the LMA is configured to: after the mobile node is registered with the network, receive packet data from the network, match a destination address prefix included in the packet data with the third matching entry in the second flow entry in the LMA, and if the matching succeeds, forward the packet data to the MAG through the tunnel between the MAG and the LMA according to the second flow entry; and
- the MAG is configured to: match the destination address prefix included in the packet data with the second matching entry in the first flow entry in the MAG, and if the matching succeeds, forward the packet data to the mobile node through the tunnel between the MAG and the LMA according to the first flow entry.

A fifth aspect of the embodiments of the present invention provides a software defined networking SDN controller, including:
- a processor for processing a message received from each network element, a receiver, and a transmitter, where
- the receiver is configured to receive a first bearer message that is forwarded by a first MAG in multiple mobile access gateways MAGs and that carries a first data link layer L2 attach request message, so that a mobile node requests to register with a network, where the first L2 attach request message is sent by the mobile node to the first MAG to request to access the first MAG, and the first L2 attach request message includes an ID of the mobile node;
- the transmitter is configured to send, to each of the first MAG and an LMA, a message for establishing a tunnel between the first MAG and the local mobility anchor LMA, to establish the tunnel between the first MAG and the LMA;
- the transmitter is further configured to send, to each of the first MAG and the LMA, a message for adjusting a flow entry of the mobile node;
- the processor is configured to: when establishment of the tunnel between the first MAG and the LMA succeeds, configure HNP(s) for the mobile node, and encapsulate the HNP(s) into a router advertisement message; and the transmitter is further configured to send the router advertisement message to the first MAG, so that the mobile node is registered with the network when the mobile node receives the router advertisement message from the first MAG A sixth aspect of the embodiments of the present invention provides a mobile access gateway MAG, including a processor, a transmitter, and a receiver, where the receiver is configured to receive a data link layer L2 attach request message sent by a mobile node, where the L2 attach request message includes an ID of the mobile node;

the transmitter is configured to: add the L2 attach request message to a bearer message, and forward the bearer message to a software defined networking SDN controller;

the receiver is further configured to receive a message that is sent by the SDN controller and for establishing a tunnel between the MAG and a local mobility anchor LMA;

the processor is configured to complete establishment of the tunnel on the MAG side according to the message for establishing a tunnel between the MAG and the LMA;

the receiver is further configured to receive a message that is sent by the SDN controller and for adjusting a flow entry of the mobile node;

the processor is further configured to adjust, according to the message for adjusting a flow entry of the mobile node, a flow entry that is of the mobile node and stored in the MAG; and the transmitter is further configured to: when establishment of the tunnel between the MAG and the LMA succeeds, forward a router advertisement message received from the SDN controller to the mobile node, so that the mobile node is registered with a network, where the router advertisement message includes HNP(s) configured by the SDN controller for the mobile node.

A seventh aspect of the embodiments of the present invention provides a local mobility anchor LMA, including a processor and a receiver, where the receiver is configured to: after a software defined networking SDN controller receives a bearer message sent by a mobile access gateway MAG, receive a message that is sent by the SDN controller and for establishing a tunnel between the MAG and the LMA, where the bearer message carries a data link layer L2 attach request message, the L2 attach request message is sent by a mobile node to the MAG to request to access the MAG, and the L2 attach request message includes an ID of the mobile node;

the processor is configured to complete establishment of the tunnel on the LMA side according to the message for establishing a tunnel between the MAG and the LMA;

the receiver is further configured to receive a message that is sent by the SDN controller and for adjusting a flow entry of the mobile node; and the processor is further configured to adjust, according to the message for adjusting a flow entry of the mobile node, a flow entry that is of the mobile node and stored in the LMA.

An eighth aspect of the embodiments of the present invention provides a binding registration method, including:

receiving, by a software defined networking SDN controller, a first bearer message that is forwarded by a first MAG in multiple mobile access gateways MAGs and that carries a first data link layer L2 attach request message, to request a mobile node to register with a network, where the first L2 attach request message is sent by the mobile node to the first MAG to request to access the first MAG, and the first L2 attach request message includes an ID of the mobile node;

sending, by the SDN controller to each of the first MAG and an LMA, a message for establishing a tunnel between the first MAG and the local mobility anchor LMA, to establish the tunnel between the first MAG and the LMA;

sending, by the SDN controller to each of the first MAG and the LMA, a message for adjusting a flow entry of the mobile node; and if establishment of the tunnel between the first MAG and the LMA succeeds, configuring, by the SDN controller, HNP(s) for the mobile node, encapsulating the HNP(s) into a router advertisement message, and sending the router advertisement message to the first MAG, so that the mobile node is registered with the network when the mobile node receives the router advertisement message from the first MAG With reference to the eighth aspect of the embodiments of the present invention, in a first implementation manner of the eighth aspect of the embodiments of the present invention, the sending, by the SDN controller to each of the first MAG and an LMA, a message for establishing a tunnel between the first MAG and the LMA is specifically:

sending, by the SDN controller, a first establishment message to the first MAG, where the first establishment message is used to instruct the first MAG to establish a tunnel interface on the first MAG side, and the first establishment message includes configuration information for establishing the tunnel interface on the first MAG side; and sending, by the SDN controller, a second establishment message to the LMA, where the second establishment message is used to instruct the LMA to establish a tunnel interface on the LMA side, and the second establishment message includes configuration information for establishing the tunnel interface on the LMA side; and the sending, by the SDN controller to each of the first MAG and the LMA, a message for adjusting a flow entry of the mobile node is specifically:

sending, by the SDN controller, a first adjustment message to the first MAG, where the first adjustment message is used to instruct the first MAG to add a first flow entry of the mobile node; and sending, by the SDN controller, a second adjustment message to the LMA, where the second adjustment message is used to instruct the LMA to add a second flow entry of the mobile node.

With reference to the first implementation manner of the eighth aspect of the embodiments of the present invention, in a second implementation manner of the eighth aspect of the embodiments of the present invention, the first flow entry is used to instruct the first MAG to forward data according to content of the first flow entry; and the second flow entry is used to instruct the LMA to forward data according to content of the second flow entry.

With reference to the second implementation manner of the eighth aspect of the embodiments of the present invention, in a third implementation manner of the eighth aspect of the embodiments of the present invention, the content of the first flow entry includes: a first matching entry: a source address prefix is the HNP(s) of the mobile node; an operation corresponding to the first matching entry: forwarding through a first MAG-LMA tunnel interface; a second matching entry: a destination address prefix is the HNP(s) of the mobile node; and an operation corresponding to the second matching entry: forwarding to a mobile node interface link; and the content of the second flow entry includes: a third matching entry: a destination address prefix is the HNP(s) of the mobile node; and an operation corresponding to the third matching entry: forwarding through an LMA-first MAG tunnel interface.

With reference to the eighth aspect of the embodiments of the present invention, or the first implementation manner of the eighth aspect, or the second implementation manner of the eighth aspect, or the third implementation manner of the eighth aspect, in a fourth implementation manner of the eighth aspect of the embodiments of the present invention, the method further includes:

when the mobile node needs to be switched from the first MAG to a second MAG in the multiple MAGs, receiving, by the SDN controller, a second bearer message that is forwarded by the second MAG and that carries a second L2 attach request message, to request the mobile node to register with the network, where the second L2 attach request message is sent by the mobile node to the second MAG to request to access the second MAG, and the second L2 attach request message includes the ID of the mobile node;

sending, by the SDN controller to each of the second MAG and the LMA, a message for establishing a tunnel between the second MAG and the LMA, to establish the tunnel between the second MAG and the LMA;

sending, by the SDN controller to each of the second MAG and the LMA, the message for adjusting a flow entry of the mobile node; and if establishment of the tunnel between the second MAG and the LMA succeeds, configuring, by the SDN controller, the HNP(s) for the mobile node, encapsulating the HNP(s) into the router advertisement message, and sending the router advertisement message to the second MAG, so that the mobile node is registered with the network when the mobile node receives the router advertisement message from the second MAG With reference to the fourth implementation manner of the eighth aspect of the embodiments of the present invention, in a fifth implementation manner of the eighth aspect of the embodiments of the present invention, the sending, by the SDN controller to each of the second MAG and the LMA, a message for establishing a tunnel between the second MAG and the LMA is specifically:

sending, by the SDN controller, a third establishment message to the second MAG, where the third establishment message is used to instruct the second MAG to establish a tunnel interface on the second MAG side, and the third establishment message includes configuration information for establishing the tunnel interface on the second MAG side; and sending, by the SDN controller, a fourth establishment message to the LMA, where the fourth establishment message is used to instruct the LMA to establish a tunnel interface on the LMA side, and the fourth establishment message includes configuration information for establishing the tunnel interface on the LMA side; and the sending, by the SDN controller to each of the first MAG and the LMA, the message for adjusting a flow entry of the mobile node is specifically:

sending, by the SDN controller, a third adjustment message to the second MAG, where the third adjustment message is used to instruct the second MAG to add a third flow entry of the mobile node; and sending, by the SDN controller, a fourth adjustment message to the LMA, where the fourth adjustment message is used to instruct the LMA to add a fourth flow entry of the mobile node.

With reference to the fifth implementation manner of the eighth aspect of the embodiments of the present invention, in a sixth implementation manner of the eighth aspect of the embodiments of the present invention, the third flow entry is used to instruct the second MAG to forward data according to content of the third flow entry; and the fourth flow entry is used to instruct the LMA to forward data according to content of the fourth flow entry.

With reference to the sixth implementation manner of the eighth aspect of the embodiments of the present invention, in a seventh implementation manner of the eighth aspect of the embodiments of the present invention, the content of the third flow entry includes: a fourth matching entry: a source address prefix is the HNP(s) of the mobile node; an operation corresponding to the fourth matching entry: forwarding through a second MAG-LMA tunnel interface; a fifth matching entry: a destination address prefix is the HNP(s) of the mobile node; and an operation corresponding to the fifth matching entry: forwarding to the mobile node interface link; and the content of the fourth flow entry includes: a sixth matching entry: a destination address prefix is the HNP(s) of the mobile node; and an operation corresponding to the sixth matching entry: forwarding through an LMA-second MAG tunnel interface.

A ninth aspect of the embodiments of the present invention provides a data forwarding method, including:

receiving, by a mobile access gateway MAG, a data link layer L2 attach request message sent by a mobile node, where the L2 attach request message includes an ID of the mobile node;

adding, by the MAG, the L2 attach request message to a bearer message, and forwarding the bearer message to a software defined networking SDN controller;

receiving, by the MAG, a message that is sent by the SDN controller and for establishing a tunnel between the MAG and a local mobility anchor LMA, and completing establishment of the tunnel on the MAG side according to the message for establishing a tunnel between the MAG and the LMA;

receiving, by the MAG, a message that is sent by the SDN controller and for adjusting a flow entry of the mobile node, and adjusting, according to the message for adjusting a flow entry of the mobile node, a flow entry that is of the mobile node and stored in the MAG; and if establishment of the tunnel between the MAG and the LMA succeeds, forwarding, by the MAG, a router advertisement message received from the SDN controller to the mobile node, so that the mobile node is registered with a network, where the router advertisement message includes HNP(s) configured by the SDN controller for the mobile node.

With reference to the ninth aspect of the embodiments of the present invention, in a first implementation manner of the ninth aspect of the embodiments of the present invention, the completing establishment of the tunnel on the MAG side according to the message for establishing a tunnel between the MAG and the LMA is specifically:

establishing, by the MAG, a tunnel interface on the MAG side according to the message for establishing a tunnel between the MAG and the LMA; and the adjusting, by the MAG according to the message for adjusting a flow entry of the mobile node, a flow entry that is of the mobile node and stored in the MAG is specifically:

adding, by the MAG, a first flow entry of the mobile node according to the message for adjusting a flow entry of the mobile node.

With reference to the first implementation manner of the ninth aspect of the embodiments of the present invention, in a second implementation manner of the ninth aspect of the embodiments of the present invention, content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

With reference to the first implementation manner of the ninth aspect of the embodiments of the present invention, or the second implementation manner of the ninth aspect, in a third implementation manner of the ninth aspect of the embodiments of the present invention, the method further includes:

after the mobile node is registered with the network, receiving, by the MAG, packet data sent by the mobile node, and matching a source address prefix included in the packet data with the first matching entry in the first flow entry in the MAG; and if the matching succeeds, forwarding, by the MAG, the packet data to the LMA through the tunnel between the MAG and the LMA according to the first flow entry, so that the LMA forwards the packet data to the network.

A tenth aspect of the embodiments of the present invention provides a data forwarding method, including:

after a software defined networking SDN controller receives a bearer message sent by a mobile access gateway MAG, receiving, by a local mobility anchor LMA, a message that is sent by the SDN controller and for establishing a tunnel between the MAG and the LMA, and completing establishment of the tunnel on the LMA side according to the message for establishing a tunnel between the MAG and the LMA, where the bearer message carries a data link layer L2 attach request message, the L2 attach request message is sent by a mobile node to the MAG to request to access the MAG, and the L2 attach request message includes an ID of the mobile node; and receiving, by the LMA, a message that is sent by the SDN controller and for adjusting a flow entry of the mobile node, and adjusting, according to the message for adjusting a flow entry of the mobile node, a flow entry that is of the mobile node and stored in the LMA.

With reference to the tenth aspect of the embodiments of the present invention, in a first implementation manner of the tenth aspect of the embodiments of the present invention, the completing establishment of the tunnel on the LMA side according to the message for establishing a tunnel between the MAG and the LMA is specifically:

establishing, by the LMA, a tunnel interface on the LMA side according to the message for establishing a tunnel between the MAG and the LMA; and the adjusting, by the LMA according to the message for adjusting a flow entry of the mobile node, a flow entry that is of the mobile node and stored in the LMA is specifically:

adding, by the LMA, a second flow entry of the mobile node according to the message for adjusting a flow entry of the mobile node.

With reference to the first implementation manner of the tenth aspect of the embodiments of the present invention, in a second implementation manner of the tenth aspect of the embodiments of the present invention, content of the second flow entry includes: a third matching entry: a destination address prefix is an HNP(s) of the mobile node; and an operation corresponding to the third matching entry: forwarding through an LMA-MAG tunnel interface.

With reference to the first implementation manner of the tenth aspect of the embodiments of the present invention, or the second implementation manner of the tenth aspect, in a third implementation manner of the tenth aspect of the embodiments of the present invention, the method further includes:

receiving, by the LMA, packet data from a network after establishment of the tunnel between the MAG and the LMA succeeds and the mobile node receives a router advertisement message to register with the network;

matching, by the LMA, a destination address prefix included in the packet data with the third matching entry in the second flow entry in the LMA; and if the matching succeeds, forwarding, by the LMA, the packet data to the MAG through the tunnel between the MAG and the LMA according to the second flow entry, so that the MAG forwards the packet data to the mobile node according to a first flow entry in the MAG With reference to the third implementation manner of the tenth aspect of the embodiments of the present invention, in a fourth implementation manner of the tenth aspect of the embodiments of the present invention, content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

It may be learned from the foregoing technical solutions that the embodiments of the present invention have the following advantages:

In the embodiments of the present invention, an SDN controller includes: a first receiving unit, a first sending unit, a second sending unit, a configuration and encapsulation unit, and a third sending unit, where the first receiving unit is configured to receive a first bearer message that is forwarded by a first MAG in multiple MAGs and that carries a first L2 attach request message, so that a mobile node requests to register with a network; the first sending unit is configured to send, to each of the first MAG and an LMA, a message for establishing a tunnel between the first MAG and the LMA, to establish the tunnel between the first MAG and the LMA; the second sending unit is configured to send, to each of the first MAG and the LMA, a message for adjusting a flow entry of the mobile node; the configuration and encapsulation unit is configured to: when establishment of the tunnel between the first MAG and the LMA succeeds, configure an HNP(s) for the mobile node, and encapsulate the HNP(s) into a router advertisement message; and the third sending unit is configured to send the router advertisement message to the first MAG, so that the mobile node is registered with the network when the mobile node receives the router advertisement message from the first MAG. In this way, the SDN controller instructs the network element devices LMA and MAG to establish the tunnel, and then the network element devices LMA and MAG may forward data according to flow entries delivered by the SDN controller, so that the network element devices do not need to negotiate with each other. In addition, in comparison with the prior art, the network element devices LMA and MAG may perform operations according to instructions of the SDN controller, and therefore complex control functions are simplified, and the network element devices LMA and MAG are applicable to any Internet Protocol (IP), thereby reducing costs in network construction.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make objectives, technical solutions and advantages of the present invention clearer, the following further describes implementation manners of the present invention in detail with reference to accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiments of the present invention provide a binding registration method, a data forwarding method, a related device, and a network system, so that network element devices do not need to negotiate with each other. In addition, in comparison with the prior art, network element devices LMA and MAG may perform operations according to instructions of an SDN controller, and therefore complex control functions are simplified, and the network element devices LMA and MAG are applicable to any IP, thereby reducing costs in network construction.

Figure 1:
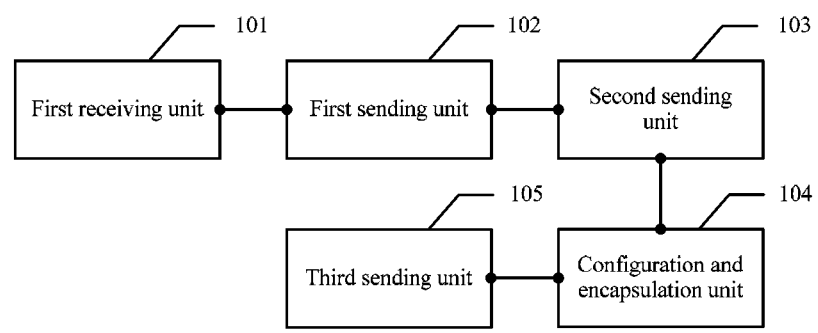
FIG. 1 is a schematic diagram of an embodiment of an SDN controller in the embodiments of the present invention.

Referring to FIG. 1, FIG. 1 shows an embodiment of a software defined networking (SDN) controller in the embodiments of the present invention. The SDN controller includes: a first receiving unit 101, a first sending unit 102, a second sending unit 103, a configuration and encapsulation unit 104, and a third sending unit 105.

The first receiving unit 101 is configured to receive a first bearer message that is forwarded by a first MAG in multiple MAGs and that carries a first L2 attach request message, to request a mobile node to register with a network, where the first L2 attach request message is sent by the mobile node to the first MAG to request to access the first MAG, and the first L2 attach request message includes an ID of the mobile node.

The first sending unit 102 is configured to send, to each of the first MAG and an LMA, a message for establishing a tunnel between the first MAG and the LMA, to establish the tunnel between the first MAG and the LMA.

The second sending unit 103 is configured to send, to each of the first MAG and the LMA, a message for adjusting a flow entry of the mobile node.

The configuration and encapsulation unit 104 is configured to: when establishment of the tunnel between the first MAG and the LMA succeeds, configure an HNP(s) for the mobile node, and encapsulate the HNP(s) into a router advertisement message.

The third sending unit 105 is configured to send the router advertisement message to the first MAG, so that the mobile node is registered with the network when the mobile node receives the router advertisement message from the first MAG In actual application, the message for establishing a tunnel between the first MAG and the LMA may include configuration information for establishing the tunnel, and tunnels of different types have different configuration information. The flow entry of the mobile node is a flow entry related to the mobile node, and the message for adjusting a flow entry of the mobile node is used to adjust flow entries of the mobile node in the first MAG and the LMA. Further, when the first MAG and the LMA each complete establishment of the tunnel and adjustment of the flow entries of the mobile node, it indicates that establishment of the tunnel between the first MAG and the LMA succeeds. In this case, the SDN controller may separately receive responses fed back by the first MAG and the LMA, so that the SDN controller is notified that establishment of the tunnel succeeds.

In this embodiment, an SDN controller includes: a first receiving unit, a first sending unit, a second sending unit, a configuration and encapsulation unit, and a third sending unit, where the first receiving unit is configured to receive a first bearer message that is forwarded by a first MAG in multiple MAGs and that carries a first L2 attach request message, so that a mobile node requests to register with a network; the first sending unit is configured to send, to each of the first MAG and an LMA, a message for establishing a tunnel between the first MAG and the LMA, to establish the tunnel between the first MAG and the LMA; the second sending unit is configured to send, to each of the first MAG and the LMA, a message for adjusting a flow entry of the mobile node; the configuration and encapsulation unit is configured to: when establishment of the tunnel between the first MAG and the LMA succeeds, configure an HNP(s) for the mobile node, and encapsulate the HNP(s) into a router advertisement message; and the third sending unit is configured to send the router advertisement message to the first MAG, so that the mobile node is registered with the network when the mobile node receives the router advertisement message from the first MAG In this way, the SDN controller instructs the network element devices LMA and MAG to establish the tunnel, and then the network element devices LMA and MAG may forward data according to flow entries delivered by the SDN controller, so that the network element devices do not need to negotiate with each other. In addition, in comparison with the prior art, the network element devices LMA and MAG may perform operations according to instructions of the SDN controller, and therefore complex control functions are simplified, and the network element devices LMA and MAG are applicable to any Internet Protocol (IP), thereby reducing costs in network construction.

Figure 2:
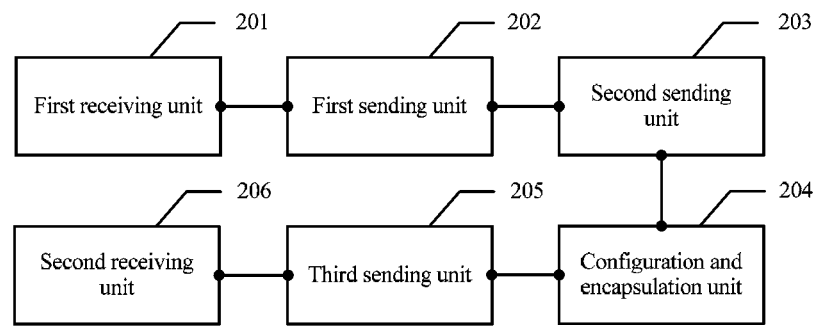
FIG. 2 is a schematic diagram of another embodiment of an SDN controller in the embodiments of the present invention.

To better understand the foregoing embodiment, the following uses a specific embodiment to describe interaction between units or components included in an SDN controller and describe a data interaction manner of the SDN controller. Referring to FIG. 2, the SDN controller includes:

a first receiving unit 201, a first sending unit 202, a second sending unit 203, a configuration and encapsulation unit 204, a third sending unit 205, and a second receiving unit 206.

The first receiving unit 201 receives a first bearer message that is forwarded by a first MAG in multiple MAGs and that carries a first L2 attach request message, to request a mobile node to register with a network, where the first L2 attach request message is sent by the mobile node to the first MAG to request to access the first MAG, and the first L2 attach request message includes an ID of the mobile node. In actual application, the mobile node determines, according to a requirement, to access the first MAG in the multiple MAGs, and in this case, the first MAG receives the first L2 attach request message. Because there is no matched flow entry in the first MAG, the first MAG sends the SDN controller the first bearer message that carries the first L2 attach request message, and then instructs the first sending unit 202 and the second sending unit 203 to perform a sending operation.

In an actual application scenario, the L2 attach request message may be carried in a packet in form in this embodiment.

The first sending unit 202 sends a first establishment message to the first MAG, and sends a second establishment message to the LMA, where the first establishment message is used to instruct the first MAG to establish a tunnel interface on the first MAG side, and the second establishment message is used to instruct the LMA to establish a tunnel interface on the LMA side. In actual application, the first establishment message includes configuration information for establishing the tunnel interface on the first MAG side, the second establishment message includes configuration information for establishing the tunnel interface on the LMA side, and tunnels of different types have different configuration information.

In an actual application scenario, establishment of an IP-in-IP tunnel is used as an example for description. In this case, the first establishment message and the second establishment message mainly include information in which an address Proxy-CoA 1 on the first MAG side and an address LMAA on the LMA side are encapsulated, where Proxy-CoA 1 is an address of the first MAG, and LMAA is an address of the LMA.

The second sending unit 203 sends a first adjustment message to the first MAG, and sends a second adjustment message to the LMA, where the first adjustment message is used to instruct the first MAG to add a first flow entry of the mobile node, and the second adjustment message is used to instruct the LMA to add a second flow entry of the mobile node.

Content of the first flow entry includes: a first matching entry: a source address prefix is an HNP(s) of the mobile node; an operation corresponding to the first matching entry: forwarding through a first MAG-LMA tunnel interface; a second matching entry: a destination address prefix is the HNP(s) of the mobile node; and an operation corresponding to the second matching entry: forwarding to a mobile node interface link. Content of the second flow entry includes: a third matching entry: a destination address prefix is the HNP(s) of the mobile node; and an operation corresponding to the third matching entry: forwarding through an LMA-first MAG tunnel interface.

If establishment of the tunnel between the first MAG and the LMA succeeds, the configuration and encapsulation unit 204 configures an HNP(s) for the mobile node, encapsulates the HNP(s) into a router advertisement message, and sends the router advertisement message to the third sending unit 205. In actual application, when the first MAG and the LMA each complete establishment of the tunnel and adjustment of the flow entries of the mobile node, it indicates that establishment of the tunnel between the first MAG and the LMA succeeds. In this case, the SDN controller may separately receive responses fed back by the first MAG and the LMA, so that the SDN controller is notified that establishment of the tunnel succeeds.

The third sending unit 205 sends the router advertisement message to the first MAG, so that the mobile node is registered with the network when the mobile node receives the router advertisement message from the first MAG. In actual application, when the mobile node receives the router advertisement message from the first MAG, it indicates that the mobile node is registered with the network. In actual application, if the mobile node does not receive the router advertisement message, the mobile node may send a router solicitation (RS) message to the first MAG to request to acquire the HNP(s), and then the first MAG may forward the received RS message to the SDN controller, so that the SDN controller delivers the HNP(s).

When the mobile node needs to be switched from the first MAG to a second MAG in the multiple MAGs, the second receiving unit 206 receives a second bearer message that is forwarded by the second MAG and that carries a second L2 attach request message, to request the mobile node to register with the network, and then instructs the first sending unit 202 and the third sending unit 203 to perform a sending operation, where the second L2 attach request message is sent by the mobile node to the second MAG to request to access the second MAG, and the second L2 attach request message includes the ID of the mobile node. In actual application, the mobile node may be switched to the second MAG in the multiple MAGs, and in this case, the second MAG receives the second L2 attach request message. Because there is no matched flow entry in the second MAG, the second MAG sends the SDN controller the second bearer message that carries the second L2 attach request message.

The first sending unit 202 sends, to each of the second MAG and the LMA, a message for establishing a tunnel between the second MAG and the LMA, to establish the tunnel between the second MAG and the LMA. In application, the message for establishing a tunnel between the second MAG and the LMA may include configuration information for establishing the tunnel, and tunnels of different types have different configuration information. Specifically, the first sending unit 202 sends a third establishment message to the second MAG, and sends a fourth establishment message to the LMA, where the third establishment message is used to instruct the second MAG to establish a tunnel interface on the second MAG side, and the fourth establishment message is used to instruct the LMA to establish a tunnel interface on the LMA side.

In an actual application scenario, establishment of an IP-in-IP tunnel is used as an example for description. In this case, the third establishment message and the fourth establishment message mainly include information in which an address Proxy-CoA 2 on the second MAG side and the address LMAA on the LMA side are encapsulated, where Proxy-CoA 2 is an address of the second MAG, and LMAA is the address of the LMA.

In actual application, the original tunnel between the first MAG and the LMA is changed to the tunnel between the second MAG and the LMA. In this case, the SDN controller may send a tunnel teardown instruction to each of the first MAG and the LMA, to tear down the tunnel between the first MAG and the LMA.

The second sending unit 203 sends, to each of the second MAG and the LMA, a message for adjusting a flow entry of the mobile node. In actual application, the message of the flow entry of the mobile node is a flow entry related to the mobile node, and the message for adjusting a flow entry of the mobile node is used to adjust flow entries of the mobile node in the first MAG and the LMA. Specifically, the second sending unit 203 sends a third adjustment message to the second MAG, and sends a fourth adjustment message to the LMA, where the third adjustment message is used to instruct the second MAG to add a third flow entry of the mobile node, and the fourth adjustment message is used to instruct the LMA to add a fourth flow entry of the mobile node.

The third flow entry is used to instruct the second MAG to forward data according to content of the third flow entry, and the fourth flow entry is used to instruct the LMA to forward data according to content of the fourth flow entry. The content of the third flow entry includes: a fourth matching entry: a source address prefix is the HNP(s) of the mobile node; an operation corresponding to the fourth matching entry: forwarding through a second MAG-LMA tunnel interface; a fifth matching entry: a destination address prefix is the HNP(s) of the mobile node; and an operation corresponding to the fifth matching entry: forwarding to the mobile node interface link. The content of the fourth flow entry includes: a sixth matching entry: a destination address prefix is the HNP(s) of the mobile node; and an operation corresponding to the sixth matching entry: forwarding through an LMA-second MAG tunnel interface.

When establishment of the tunnel between the second MAG and the LMA succeeds, the configuration and encapsulation unit 204 configures the HNP(s) for the mobile node, and encapsulates the HNP(s) into the router advertisement message. In actual application, when the second MAG and the LMA each complete establishment of the tunnel and adjustment of the flow entries of the mobile node, it indicates that establishment of the tunnel between the second MAG and the LMA succeeds. In this case, the SDN controller may separately receive responses fed back by the second MAG and the LMA, so that the SDN controller is notified that establishment of the tunnel succeeds.

When establishment of the tunnel between the second MAG and the LMA succeeds, the third sending unit 205 sends the router advertisement message to the second MAG, so that the mobile node is registered with the network when the mobile node receives the router advertisement message from the second MAG, where the router advertisement message includes the HNP(s) configured by the SDN controller for the mobile node.

In this embodiment, a first sending subunit 2021 instructs network element devices LMA and first MAG to establish a tunnel, and a second sending subunit 2031 sends a flow entry of a mobile node to each of the first MAG and the LMA, so that the network element devices do not need to perform complex tunnel parameter negotiation with each other. In addition, in comparison with the prior art, the network element devices LMA and MAG may perform operations according to instructions of an SDN controller without complex control functions, and therefore the network element devices LMA and MAG are applicable to any Internet Protocol (IP), thereby reducing costs in network construction. When the mobile node needs to be switched from the first MAG to a second MAG, a first sending unit 202 may further instruct the network element devices LMA and second MAG to establish a tunnel, and a second sending unit 203 sends a flow entry of the mobile node to each of the second MAG and the LMA, and therefore the LMA and a different MAG do not need to perform a frequent and complex signaling interworking process when the mobile node moves and is switched to the different MAG, thereby increasing a processing speed of the network element device, and improving network bandwidth utilization.

Figure 3:
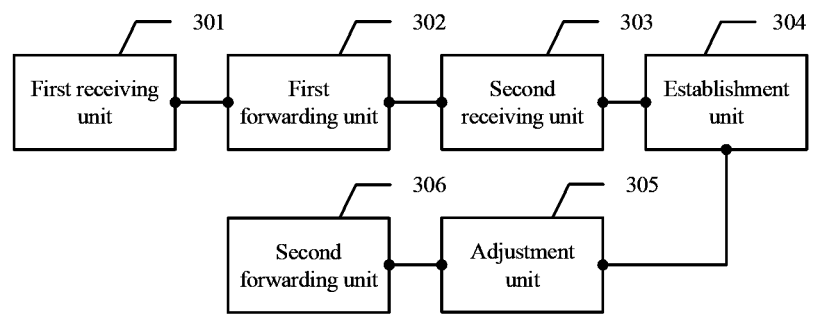
FIG. 3 is a schematic diagram of an embodiment of a MAG in the embodiments of the present invention.

Referring to FIG. 3, FIG. 3 shows an embodiment of a MAG in the embodiments of the present invention. The MAG includes: a first receiving unit 301, a first forwarding unit 302, a second receiving unit 303, an establishment unit 304, an adjustment unit 305, and a second forwarding unit 306.

The first receiving unit 301 is configured to receive an L2 attach request message sent by a mobile node, where the L2 attach request message includes an ID of the mobile node.

The first forwarding unit 302 is configured to: add the L2 attach request message to a bearer message, and forward the bearer message to an SDN controller.

The second receiving unit 303 is configured to receive a message that is sent by the SDN controller and for establishing a tunnel between the MAG and a local mobility anchor LMA.

The establishment unit 304 is configured to complete establishment of the tunnel on the MAG side according to the message for establishing a tunnel between the MAG and the LMA.

The second receiving unit 303 is further configured to receive a message that is sent by the SDN controller and for adjusting a flow entry of the mobile node.

The adjustment unit 305 is configured to adjust, according to the message for adjusting a flow entry of the mobile node, a flow entry that is of the mobile node and stored in the MAG The second forwarding unit 306 is configured to: when establishment of the tunnel between the MAG and the LMA succeeds, forward a router advertisement message received from the SDN controller to the mobile node, so that the mobile node is registered with a network, where the router advertisement message includes an HNP(s) configured by the SDN controller for the mobile node.

In this embodiment, the message for establishing a tunnel between the MAG and the LMA may include configuration information for establishing the tunnel, and tunnels of different types have different configuration information. The message of the flow entry of the mobile node is a flow entry related to the mobile node.

In actual application, the SDN controller simultaneously sends the LMA the message for establishing a tunnel between the LMA and the MAG, and the LMA may complete establishment of the tunnel on the LMA side according to the message for establishing a tunnel between the LMA and the MAG. The SDN controller also sends the LMA the message for adjusting a flow entry of the mobile node, so that the LMA adjusts, according to the message for adjusting a flow entry of the mobile node, a flow entry that is of the mobile node and stored in the LMA. Then the second forwarding unit 306 may feed back a response to the SDN controller, and the LMA may also feed back a response to the SDN controller, to notify the SDN controller that establishment of the tunnel between the MAG and the LMA succeeds.

In this embodiment, a first receiving unit 302, a second receiving unit 303, an establishment unit 304, and an adjustment unit 305 add an L2 attach request message to a bearer message, forward the bearer message to an SDN controller, then complete establishment of a tunnel on a MAG side according to a message that is sent by the SDN controller and for establishing a tunnel between the MAG and an LMA, and adjust, according to a message that is sent by the SDN controller and for adjusting a flow entry of a mobile node, a flow entry that is of the mobile node and stored in the MAG, so that the MAG and the LMA do not need to negotiate with each other to establish the tunnel. In addition, in comparison with the prior art, the network element device MAG may perform an operation according to an instruction of the SDN controller, and therefore a complex control function is simplified, and the network element device MAG is applicable to any IP, thereby reducing costs in network construction.

Figure 4:
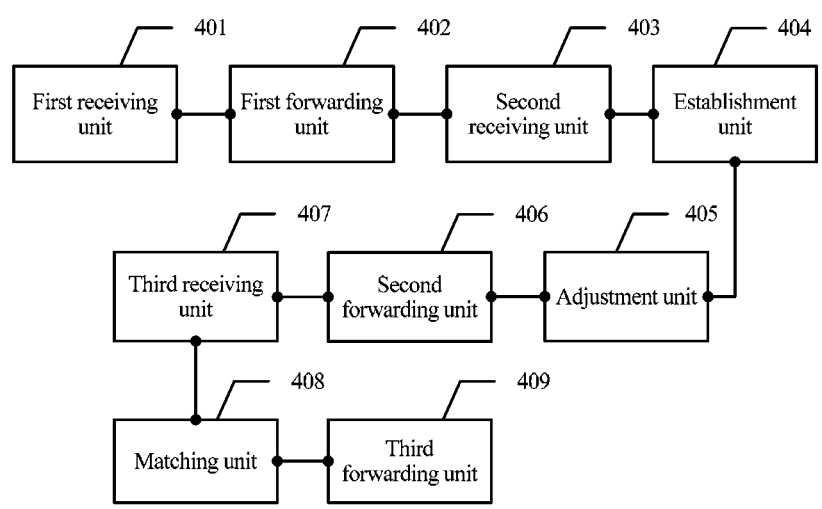
FIG. 4 is a schematic diagram of another embodiment of a MAG in the embodiments of the present invention.

To better understand the foregoing embodiment, the following uses a specific embodiment to describe interaction between units or components included in a MAG and describe a data interaction manner of the MAG. Referring to FIG. 4, the MAG includes:

a first receiving unit 401, a first forwarding unit 402, a second receiving unit 403, an establishment unit 404, an adjustment unit 405, a second forwarding unit 406, a third receiving unit 407, a matching unit 408, and a third forwarding unit 409.

The first receiving unit 401 receives an L2 attach request message sent by a mobile node, where the L2 attach request message includes an ID of the mobile node. In actual application, the mobile node sends the L2 attach request message to the MAG so as to access the MAG Because there is no matched flow entry when the MAG receives the L2 attach request message, the first forwarding unit 402 adds the L2 attach request message to a bearer message, and forwards the bearer message to an SDN controller.

The second receiving unit 403 receives an establishment message and an adjustment message that are sent by the SDN controller, and then sends the establishment message to the establishment unit 404 and sends the adjustment message to the adjustment unit 405. In actual application, the establishment message is used to instruct the MAG to establish a tunnel interface on the MAG side in a tunnel between the MAG and an LMA, and the establishment message includes configuration information for establishing the tunnel interface on the MAG side.

The establishment unit 404 establishes the tunnel interface on the MAG side according to the establishment message. In actual application, the network element device LMA may also receive another establishment message sent by the SDN controller, and the LMA establishes a tunnel interface on the LMA side according to the another establishment message, where the another establishment message includes configuration information for establishing the tunnel interface on the LMA side.

The adjustment unit 405 adds a first flow entry of the mobile node according to the adjustment message, where content of the first flow entry includes: a first matching entry: a source address prefix is an HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link. In actual application, the MAG may forward data according to the first flow entry.

In actual application, the network element device LMA may also receive another adjustment message sent by the SDN controller, and the LMA may add a second flow entry according to the another adjustment message, where content of the second flow entry includes: a third matching entry: a destination address prefix is the HNP(s) of the mobile node; and an operation corresponding to the third matching entry: forwarding through an LMA-MAG tunnel interface.

When establishment of the tunnel between the MAG and the LMA succeeds, the second forwarding unit 406 forwards a router advertisement message received from the SDN controller to the mobile node, so that the mobile node is registered with a network, where the router advertisement message includes an HNP(s) configured by the SDN controller for the mobile node. In actual application, the establishment unit 404 and the adjustment unit 405 may notify the second forwarding unit 407 when completing operations. In this case, the second forwarding unit may first feed back a response to the SDN controller. Certainly, after the LMA completes establishment of the tunnel interface on the LMA side and adjustment of a flow entry that is of the mobile node and stored in the LMA, the LMA may also feed back a response to the SDN controller, to notify the SDN controller that establishment of the tunnel between the MAG and the LMA succeeds.

In actual application, if the mobile node does not receive the router advertisement message, the mobile node may send a router solicitation (RS) message to the first MAG to request to acquire the HNP(s), and then the first MAG may forward the received RS message to the SDN controller, so that the SDN controller delivers the HNP(s).

After the mobile node is registered with the network, the third receiving unit 407 receives packet data sent by the mobile node, and sends the packet data to the matching unit 408.

The matching unit 408 matches a source address prefix included in the packet data with the first matching entry in the first flow entry in the MAG, and if the matching succeeds, sends the packet data to the third forwarding unit 409; or if the matching fails, it indicates that forwarding of the packet data fails. In actual application, if the source address prefix included in the packet data is the HNP(s) of the mobile node, it indicates that matching with the first matching entry in the first flow entry succeeds.

The third forwarding unit 409 forwards the packet data to the LMA through the tunnel between the MAG and the LMA according to the first flow entry, so that the LMA forwards the packet data to the network. In actual application, the LMA forwards the packet data to the network without a flow entry of the mobile node, and the LMA needs to forward the packet data to the network according to another flow entry. How to forward the packet data to the network according to the another flow entry is the prior art, and no further details are provided herein.

For example, the content of the first flow entry includes: the first matching entry: the source address prefix is the HNP(s) of the mobile node; the operation corresponding to the first matching entry: forwarding through the MAG-LMA tunnel interface; the second matching entry: the destination address prefix is the HNP(s) of the mobile node; and the operation corresponding to the second matching entry: forwarding to the mobile node interface link. If the source address prefix included in the packet data received by the third receiving unit 407 is the HNP(s) of the mobile node, it may be determined that matching with the source address prefix of the first matching entry in the first flow entry succeeds. Then the matching unit 408 may perform the operation corresponding to the first matching entry in the first flow entry, that is, forwarding through the MAG-LMA tunnel interface. In this case, the third forwarding unit 409 needs to forward the packet data to the LMA through the MAG-LMA tunnel by using an address of the MAG as a source address and an address of the LMA as a destination address.

In this embodiment, a first forwarding unit 402 adds an L2 attach request message to a bearer message, and forwards the bearer message to an SDN controller, and then an establishment unit 404 and an adjustment unit 405 establish a tunnel on a MAG side according to a message for establishing a tunnel and a message for adjusting a flow entry of a mobile node that are sent by the SDN controller, so that the MAG does not need to negotiate with an LMA. In addition, in comparison with the prior art, the network element device MAG may perform an operation according to an instruction of the SDN controller without a complex control function, and therefore the network element device MAG is applicable to any IP, thereby reducing costs in network construction. When the mobile node has packet data that needs to be sent to a network, a third forwarding unit 409 may forward the packet data to the LMA according to a first flow entry delivered by the SDN controller, so that the LMA forwards the packet data to the network, and the LMA and the MAG do not need to negotiate with each other to forward the packet data, which reduces complex signaling interworking performed when the LMA and the MAG forward the packet data, thereby increasing a processing speed of the network element device, and improving network bandwidth utilization.

Figure 5:
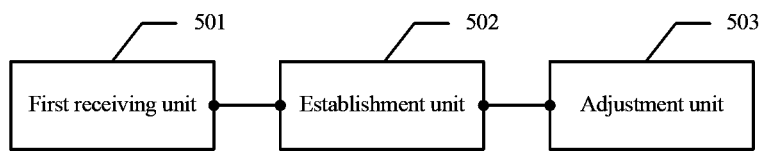
FIG. 5 is a schematic diagram of an embodiment of an LMA in the embodiments of the present invention.

Referring to FIG. 5, FIG. 5 shows an embodiment of an LMA in the embodiments of the present invention. The LMA includes:

a first receiving unit 501, an establishment unit 502, and an adjustment unit 503.

The first receiving unit 501 is configured to: after an SDN controller receives a bearer message sent by a MAG, receive a message that is sent by the SDN controller and for establishing a tunnel between the MAG and the LMA, where the bearer message carries an L2 attach request message, the L2 attach request message is sent by a mobile node to the MAG to request to access the MAG, and the L2 attach request message includes an ID of the mobile node.

The establishment unit 502 is configured to complete establishment of the tunnel on the LMA side according to the message for establishing a tunnel between the MAG and the LMA.

The first receiving unit 501 is further configured to receive a message that is sent by the SDN controller and for adjusting a flow entry of the mobile node.

The adjustment unit 503 is configured to adjust, according to the message for adjusting a flow entry of the mobile node, a flow entry that is of the mobile node and stored in the LMA.

In this embodiment, the message for establishing a tunnel between the MAG and the LMA may include configuration information for establishing the tunnel, and tunnels of different types have different configuration information. The message of the flow entry of the mobile node is a flow entry related to the mobile node.

In actual application, the MAG may also receive another message that is sent by the SDN controller and for establishing a tunnel between the MAG and the LMA, and complete establishment of the tunnel on the MAG side according to the another message for establishing a tunnel between the MAG and the LMA. The SDN controller may also send the MAG the message for adjusting a flow entry of the mobile node, so that the MAG adjusts, according to the message for adjusting a flow entry of the mobile node, a flow entry that is of the mobile node and stored in the MAG. Further, after the LMA completes operations in step 501 and step 502, the LMA may feed back a response to the SDN controller. Certainly, after the MAG completes establishment of the tunnel on the MAG side and adjustment of the flow entry that is of the mobile node and stored in the MAG, the MAG may also feed back a response to the SDN controller, to notify the SDN controller that establishment of the tunnel between the MAG and the LMA succeeds, and then the SDN controller forwards a router advertisement message to the mobile node by using the MAG. After the mobile node receives the router advertisement message, it indicates that the mobile node is registered with a network, where the router advertisement message includes an HNP(s) configured by the SDN controller for the mobile node.

In this embodiment, an establishment unit 502 completes establishment of a tunnel on an LMA side according to a message for establishing a tunnel between a MAG and the LMA, and an adjustment unit 503 adjusts, according to a message for adjusting a flow entry of an mobile node, a flow entry that is of the mobile node and stored in the LMA, so that the MAG and the LMA do not need to negotiate with each other to establish the tunnel. In addition, in comparison with the prior art, the network element device LMA may perform an operation according to an instruction of an SDN controller, and therefore a complex control function is simplified, and the network element device LMA is applicable to any IP, thereby reducing costs in network construction.

Figure 6:
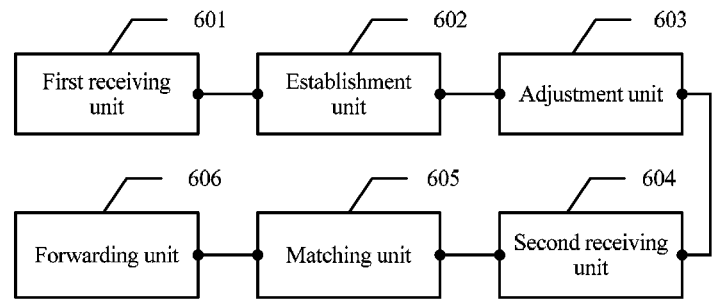
FIG. 6 is a schematic diagram of another embodiment of an LMA in the embodiments of the present invention.

To better understand the foregoing embodiment, the following uses a specific embodiment to describe interaction between units or components included in an LMA and describe a data interaction manner of the LMA. Referring to FIG. 6, the LMA includes: a first receiving unit 601, an establishment unit 602, an adjustment unit 603, a second receiving unit 604, a matching unit 605, and a forwarding unit 606.

After an SDN controller receives a bearer message sent by a MAG, the first receiving unit 601 receives an establishment message and an adjustment message that are sent by the SDN controller, and sends the establishment message to the establishment unit 602 and sends the adjustment message to the adjustment unit 603, where the bearer message carries an L2 attach request message, the L2 attach request message is sent by a mobile node to the MAG to request to access the MAG, and the L2 attach request message includes an ID of the mobile node. In actual application, the establishment message is used to instruct the LMA to establish a tunnel interface on the LMA side in a tunnel between the MAG and the LMA, the establishment message includes configuration information for establishing the tunnel interface on the LMA side, and tunnels of different types have different configuration information.

The establishment unit 602 establishes the tunnel interface on the LMA side according to the establishment message. In actual application, the network element device MAG may also receive another establishment message sent by the SDN controller, and complete establishment of a tunnel interface on the MAG side according to the another establishment message, where the another establishment message includes configuration information for establishing the tunnel interface on the MAG side.

The adjustment unit 603 adds a second flow entry of the mobile node according to the adjustment message, where content of the second flow entry includes: a third matching entry: a destination address prefix is an HNP(s) of the mobile node; and an operation corresponding to the third matching entry: forwarding through an LMA-MAG tunnel interface. In actual application, the LMA may forward data according to the second flow entry, and the network element device MAG may also add a first flow entry according to an instruction of the SDN controller.

Further, after the establishment unit 602 and the adjustment unit 603 complete operations, the LMA may instruct the forwarding unit 606 to feed back a response to the SDN controller. Certainly, after the MAG completes establishment of the tunnel interface on the MAG side and adding of the first flow entry, the MAG may also feed back a response to the SDN controller, to notify the SDN controller that establishment of the tunnel between the MAG and the LMA succeeds. Then the SDN controller forwards a router advertisement message to the mobile node by using the MAG, where the router advertisement message includes an HNP(s) configured by the SDN controller for the mobile node.

In actual application, if the mobile node does not receive the router advertisement message, the mobile node may send a router solicitation (RS) message to the first MAG to request to acquire the HNP(s), and then the first MAG may forward the received RS message to the SDN controller, so that the SDN controller delivers the HNP(s).

After establishment of the tunnel between the MAG and the LMA succeeds and the mobile node receives the router advertisement message to register with a network, the second receiving unit 604 receives packet data from the network, and sends the packet data to the matching unit 605.

The matching unit 605 matches a destination address prefix included in the packet data with the third matching entry in the second flow entry in the LMA, and if the matching succeeds, sends the packet data to the forwarding unit 606; or if the matching fails, it indicates that forwarding of the packet data fails. In actual application, if the destination address prefix included in the packet data is the HNP(s) of the mobile node, it indicates that matching with the third matching entry in the second flow entry succeeds.

The forwarding unit 606 forwards the packet data to the MAG through the tunnel between the MAG and the LMA according to the second flow entry, so that the MAG forwards the packet data to the mobile node according to the first flow entry in the MAG Content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

For example, the content of the second flow entry includes: the third matching entry: the destination address prefix is the HNP(s) of the mobile node; and the operation corresponding to the third matching entry: forwarding through the LMA-MAG tunnel interface. If the destination address prefix included in the packet data received by the second receiving unit 604 is the HNP(s) of the mobile node, it may be determined that matching with the destination address prefix of the third matching entry in the second flow entry succeeds. Then the matching unit 605 may perform the operation corresponding to the third matching entry in the second flow entry, that is, forwarding through the LMA-MAG tunnel interface. In this case, the forwarding unit 606 forwards the packet data to the MAG through the LMA-MAG tunnel interface by using an address of the LMA as a source address and an address of the MAG as a destination address.

Further, in actual application, after receiving the packet data, the MAG may forward the packet data to the mobile node according to the first flow entry in the MAG. In this case, the MAG needs to match the destination address prefix included in the packet data with the second matching entry in the first flow entry, and after the matching succeeds, forward the packet data to the mobile node according to the first flow entry in the MAG. Specifically, if the destination address prefix included in the packet data is the HNP(s) of the mobile node, it indicates that matching with the second matching entry in the first flow entry succeeds.

In this embodiment, an establishment unit 602 establishes a tunnel interface on an LMA side and a tunnel interface on a MAG side according to an establishment message sent by an SDN controller, and an adjustment unit 603 adds a second flow entry of a mobile node according to an adjustment message sent by the SDN controller, so that the MAG and the LMA do not need to negotiate with each other to establish a tunnel. The network element device LMA may perform an operation according to an instruction of the SDN controller, and therefore a complex control function is simplified, and the network element device LMA is applicable to any IP, thereby reducing costs in network construction. When a network has packet data that needs to be sent to the mobile node, the LMA may forward the packet data to the MAG according to the second flow entry delivered by the SDN controller, so that the MAG sends the packet data to the mobile node according to a first flow entry delivered by the SDN controller, and the LMA and the MAG do not need to negotiate with each other to forward the packet data, which reduces complex signaling interworking performed when the LMA and the MAG forward the packet data, thereby increasing a processing speed of the network element device, and improving network bandwidth utilization.

Figure 7:
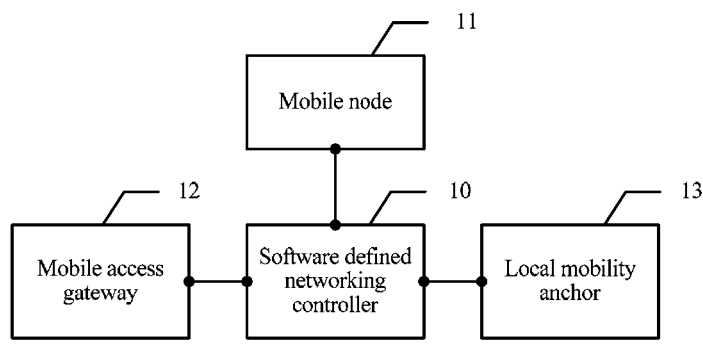
FIG. 7 is a schematic diagram of an embodiment of a network system in the embodiments of the present invention.

Referring to FIG. 7, FIG. 7 shows an embodiment of a network system in the embodiments of the present invention. The network system includes an SDN controller 10, an MN 11, a MAG 12, and an LMA 13.

The MN 11 is configured to send an L2 attach request message to the MAG 12 when the MN 11 needs to access the MAG 12, where the L2 attach request message includes an ID of the MN 11.

The MAG 12 is configured to: add the received L2 attach request message to a bearer message, and forward the bearer message to the SDN controller 10.

The SDN controller 10 is configured to: send, to each of the MAG 12 and the LMA 13, a message for establishing a tunnel between the MAG 12 and the LMA 13, and send, to each of the MAG 12 and the LMA 13, a message for adjusting a flow entry of the MN 11.

The MAG 12 is configured to: complete establishment of the tunnel on the MAG 12 side according to the received message for establishing a tunnel between the MAG 12 and the LMA 13, and adjust, according to the received message for adjusting a flow entry of the MN 11, a flow entry that is of the MN 11 and stored in the MAG 12.

The LMA 13 is configured to: complete establishment of the tunnel on the LMA 13 side according to the message for establishing a tunnel between the MAG 12 and the LMA 13, and adjust, according to the message for adjusting a flow entry of the MN 11, a flow entry that is of the MN 11 and stored in the LMA 13.

The SDN controller 10 is further configured to: after establishment of the tunnel between the MAG 12 and the LMA 13 succeeds, configure an HNP(s) for the MN 11, encapsulate the HNP(s) into a router advertisement message, and send the router advertisement message to the MAG 12.

The MN 11 is further configured to receive the router advertisement message forwarded by the MAG 12, to register with a network.

In this embodiment, an MN 11 sends an L2 attach request message to a MAG 12 when the MN 11 needs to access the MAG 12; the MAG 12 adds the received L2 attach request message to a bearer message, and forwards the bearer message to an SDN controller 10; and then the SDN controller 10 sends, to each of the MAG 12 and an LMA 13, a message for establishing a tunnel between the MAG 12 and the LMA 13, and sends, to each of the MAG 12 and the LMA 13, a message for adjusting a flow entry of the MN 11. In this way, the MAG 12 and the LMA 13 may establish the tunnel and adjust the flow entry of the MN 11 according to operation instructions delivered by the SDN controller 10, so that the network element devices MAG 12 and LMA 13 do not need to negotiate with each other. In addition, in comparison with the prior art, the network element devices LMA 13 and MAG 12 may perform operations according to the instructions of the SDN controller 10, and therefore complex control functions are simplified, and the network element devices LMA 13 and MAG 12 are applicable to any IP, thereby reducing costs in network construction.

Figure 8:
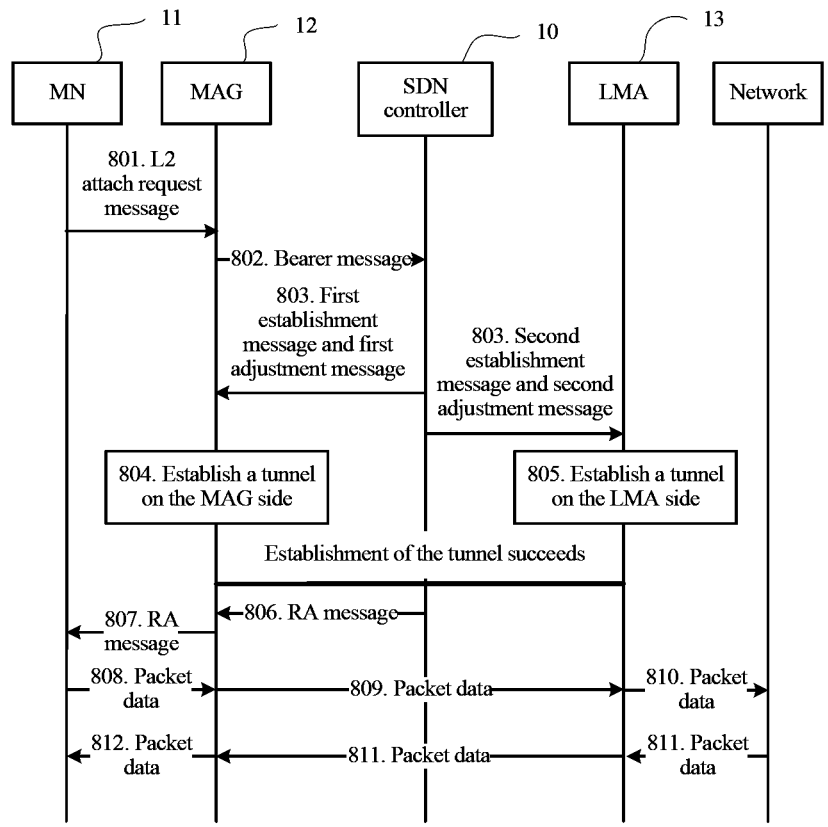
FIG. 8 is a schematic diagram of signaling interworking between each network element in a network system and a network in the embodiments of the present invention.

Referring to FIG. 8, the following describes a process of signaling interworking between network element devices in a network system in an embodiment of the present invention.

801. An MN 11 sends an L2 attach request message to a MAG 12 when the MN 11 needs to access the MAG 12, where the L2 attach request message includes an ID of the MN 11.

802. The MAG 12 adds the received L2 attach request message to a bearer message, and forwards the bearer message to an SDN controller 10.

803. The SDN controller 10 sends a first establishment message and a first adjustment message to the MAG 12, and sends a second establishment message and a second adjustment message to an LMA 13.

804. The MAG 12 establishes a tunnel interface on the MAG 12 side according to the received first establishment message, and adds a first flow entry of the MN 11 according to the first adjustment message, where content of the first flow entry includes: a first matching entry: a source address prefix is an HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

805. The LMA 13 establishes a tunnel interface on the LMA 13 side according to the received second establishment message, and adds a second flow entry of the MN 11 according to the second adjustment message, where content of the second flow entry includes: a third matching entry: a destination address prefix is the HNP(s) of the mobile node; and an operation corresponding to the third matching entry: forwarding through an LMA-MAG tunnel interface.

806. After establishment of a tunnel between the MAG 12 and the LMA 13 succeeds, the SDN controller 10 configures an HNP(s) for the MN 11, encapsulates the HNP(s) into a router advertisement message, and sends the router advertisement message to the MAG 12.

807. The MN 11 receives the router advertisement message forwarded by the MAG 12, to register with a network.

808. The MN 11 sends packet data to the accessed MAG 12 after the MN 11 is registered with the network.

809. The MAG 12 matches a source address prefix included in the received packet data with the first matching entry in the first flow entry in the MAG 12, and if the matching succeeds, forwards the packet data to the LMA 13 through the tunnel between the MAG 12 and the LMA 13 according to the first flow entry, where a source address of the MN 11 includes the HNP(s).

810. The LMA 13 forwards the received packet data to the network.

811. After the MN 11 is registered with the network, the LMA 13 receives the packet data from the network, matches a destination address prefix included in the packet data with the third matching entry in the second flow entry in the LMA 13, and if the matching succeeds, forwards the packet data to the MAG 12 through the tunnel between the MAG 12 and the LMA 13 according to the second flow entry.

812. The MAG 12 matches the destination address prefix included in the packet data with the second matching entry in the first flow entry in the MAG 12, and if the matching succeeds, forwards the packet data to the MN 11 through the tunnel between the MAG 12 and the LMA 13 according to the first flow entry.

It should be noted that there is a parallel relationship between step 807 to step 809 and step 810 to step 812.

In this embodiment, when an MN 11 needs to register with a network, an SDN controller 10 sends, to network element devices LMA 13 and MAG 12, a message for establishing a tunnel between the two network element devices and a message for adjusting flow entries that are of the MN 11 and stored in the MAG 12 and the LMA 13, and the MAG 12 and the LMA 13 may establish the tunnel and adjust the respectively stored flow entry of the MN 11 according to the messages sent by the SDN controller 10, so that the MAG 12 and the LMA 13 do not need to negotiate with each other when establishing the tunnel. In addition, in comparison with the prior art, the network element devices LMA 13 and MAG 12 may perform operations according to instructions of the SDN controller 10 without complex control functions, and therefore the network element devices LMA 13 and MAG 12 are applicable to any IP, thereby reducing costs in network construction. In addition, the MAG 12 and the LMA 13 need to forward packet data only according to the stored flow entries of the MN 11, and the LMA 13 and the MAG 12 do not need to negotiate with each other to forward the packet data, which reduces complex signaling interworking performed when the LMA 13 and the MAG 12 forward the packet data, thereby increasing a processing speed of the network element device, and improving network bandwidth utilization.

Figure 9:
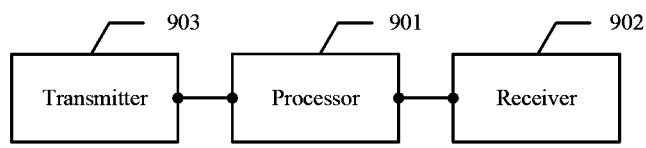
FIG. 9 is a schematic diagram of an embodiment of an SDN controller in the embodiments of the present invention.

The following further describes an SDN controller in an embodiment of the present invention. Referring to FIG. 9, FIG. 9 shows an embodiment of an SDN controller in the embodiments of the present invention. The SDN controller includes:

a processor 901 for processing a message received from each network element, a receiver 902, and a transmitter 903.

The receiver 902 is configured to receive a first bearer message that is forwarded by a first MAG in multiple MAGs and that carries a first L2 attach request message, so that a mobile node requests to register with a network, where the first L2 attach request message is sent by the mobile node to the first MAG to request to access the first MAG, and the first L2 attach request message includes an ID of the mobile node.

The transmitter 903 is configured to send, to each of the first MAG and an LMA, a message for establishing a tunnel between the first MAG and the LMA, to establish the tunnel between the first MAG and the LMA.

The transmitter 903 is further configured to send, to each of the first MAG and the LMA, a message for adjusting a flow entry of the mobile node.

The processor 901 is configured to: when establishment of the tunnel between the first MAG and the LMA succeeds, configure an HNP(s) for the mobile node, and encapsulate the HNP(s) into a router advertisement message.

The transmitter 903 is further configured to send the router advertisement message to the first MAG, so that the mobile node is registered with the network when the mobile node receives the router advertisement message from the first MAG In addition, the transmitter 903 is further configured to send a first establishment message to the first MAG, where the first establishment message is used to instruct the first MAG to establish a tunnel interface on the first MAG side, and the first establishment message includes configuration information for establishing the tunnel interface on the first MAG side.

The transmitter 903 is further configured to send a second establishment message to the LMA, where the second establishment message is used to instruct the LMA to establish a tunnel interface on the LMA side, and the second establishment message includes configuration information for establishing the tunnel interface on the LMA side.

The transmitter 903 is further configured to send a first adjustment message to the first MAG, where the first adjustment message is used to instruct the first MAG to add a first flow entry of the mobile node.

The transmitter 903 is further configured to send a second adjustment message to the LMA, where the second adjustment message is used to instruct the LMA to add a second flow entry of the mobile node.

The first flow entry is used to instruct the first MAG to forward data according to content of the first flow entry, and the second flow entry is used to instruct the LMA to forward data according to content of the second flow entry.

The content of the first flow entry includes: a first matching entry: a source address prefix is the HNP(s) of the mobile node; an operation corresponding to the first matching entry: forwarding through a first MAG-LMA tunnel interface; a second matching entry: a destination address prefix is the HNP(s) of the mobile node; and an operation corresponding to the second matching entry: forwarding to a mobile node interface link.

The content of the second flow entry includes: a third matching entry: a destination address prefix is the HNP(s) of the mobile node; and an operation corresponding to the third matching entry: forwarding through an LMA-first MAG tunnel interface.

The receiver 902 is further configured to: when the mobile node needs to be switched from the first MAG to a second MAG in the multiple MAGs, receive a second bearer message that is forwarded by the second MAG and that carries a second L2 attach request message, so that the mobile node requests to register with the network, where the second L2 attach request message is sent by the mobile node to the second MAG to request to access the second MAG, and the second L2 attach request message includes the ID of the mobile node.

The transmitter 903 is further configured to send, to each of the second MAG and the LMA, a message for establishing a tunnel between the second MAG and the LMA, to establish the tunnel between the second MAG and the LMA.

The transmitter 903 is further configured to send, to each of the second MAG and the LMA, the message for adjusting a flow entry of the mobile node.

The processor 901 is further configured to: when establishment of the tunnel between the second MAG and the LMA succeeds, configure the HNP(s) for the mobile node, and encapsulate the HNP(s) into the router advertisement message.

The transmitter 903 is further configured to send the router advertisement message to the second MAG when establishment of the tunnel between the second MAG and the LMA succeeds, so that the mobile node is registered with the network when the mobile node receives the router advertisement message from the second MAG, where the router advertisement message includes the HNP(s) configured by the SDN controller for the mobile node.

The transmitter 903 is further configured to send a third establishment message to the second MAG, where the third establishment message is used to instruct the second MAG to establish a tunnel interface on the second MAG side, and the third establishment message includes configuration information for establishing the tunnel interface on the second MAG side.

The transmitter 903 is further configured to send a fourth establishment message to the LMA, where the fourth establishment message is used to instruct the LMA to establish a tunnel interface on the LMA side, and the fourth establishment message includes configuration information for establishing the tunnel interface on the LMA side.

The transmitter 903 is further configured to send a third adjustment message to the second MAG, where the third adjustment message is used to instruct the second MAG to add a third flow entry of the mobile node.

The transmitter 903 is further configured to send a fourth adjustment message to the LMA, where the fourth adjustment message is used to instruct the LMA to add a fourth flow entry of the mobile node.

The third flow entry is used to instruct the second MAG to forward data according to content of the third flow entry.

The fourth flow entry is used to instruct the LMA to forward data according to content of the fourth flow entry.

The content of the third flow entry includes: a fourth matching entry: a source address prefix is the HNP(s) of the mobile node; an operation corresponding to the fourth matching entry: forwarding through a second MAG-LMA tunnel interface; a fifth matching entry: a destination address prefix is the HNP(s) of the mobile node; and an operation corresponding to the fifth matching entry: forwarding to the mobile node interface link.

The content of the fourth flow entry includes: a sixth matching entry: a destination address prefix is the HNP(s) of the mobile node; and an operation corresponding to the sixth matching entry: forwarding through an LMA-second MAG tunnel interface.

In this embodiment, a receiver 902 receives a first bearer message that is forwarded by a first MAG in multiple MAGs and that carries a first L2 attach request message, to request a mobile node to register with a network; a transmitter 903 sends, to each of the first MAG and an LMA, a message for establishing a tunnel between the first MAG and the LMA, to establish the tunnel between the first MAG and the LMA, and sends, to each of the first MAG and the LMA, a message for adjusting a flow entry of the mobile node; a processor 901 configures an HNP(s) for the mobile node, and encapsulates the HNP(s) into a router advertisement message; and then the transmitter 903 sends the router advertisement message to the first MAG. In this way, an SDN controller instructs the LMA and the first MAG to establish the tunnel, and sends a flow entry of the mobile node to each of the first MAG and the LMA, so that the LMA and the MAG do not need to negotiate with each other. In addition, in comparison with the prior art, the network element devices LMA and MAG may perform operations according to instructions of the SDN controller, and therefore complex control functions are simplified, and the network element devices LMA and MAG are applicable to any IP, thereby reducing costs in network construction.

Figure 10:
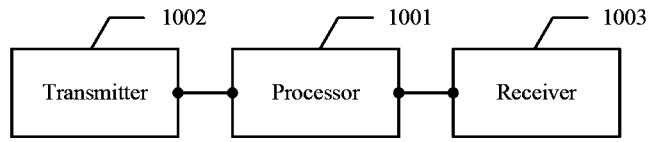
FIG. 10 is a schematic diagram of an embodiment of a MAG in the embodiments of the present invention.

The following further describes a MAG in an embodiment of the present invention. Referring to FIG. 10, FIG. 10 shows an embodiment of a MAG in the embodiments of the present invention. The MAG includes:

a processor 1001, a transmitter 1002, and a receiver 1003.

The receiver 1003 is configured to receive an L2 attach request message sent by a mobile node, where the L2 attach request message includes an ID of the mobile node.

The transmitter 1002 is configured to: add the L2 attach request message to a bearer message, and forward the bearer message to a software defined networking SDN controller.

The receiver 1003 is further configured to receive a message that is sent by the SDN controller and for establishing a tunnel between the MAG and a local mobility anchor LMA.

The processor 1001 is configured to complete establishment of the tunnel on the MAG side according to the message for establishing a tunnel between the MAG and the LMA.

The receiver 1003 is further configured to receive a message that is sent by the SDN controller and for adjusting a flow entry of the mobile node.

The processor 1001 is further configured to adjust, according to the message for adjusting a flow entry of the mobile node, a flow entry that is of the mobile node and stored in the MAG The transmitter 1002 is further configured to: when establishment of the tunnel between the MAG and the LMA succeeds, forward a router advertisement message received from the SDN controller to the mobile node, so that the mobile node is registered with a network, where the router advertisement message includes an HNP(s) configured by the SDN controller for the mobile node.

In addition, the receiver 1003 is further configured to receive an establishment message and an adjustment message that are sent by the SDN controller.

The processor 1001 is further configured to: establish a tunnel interface on the MAG side according to the establishment message, and add a first flow entry of the mobile node according to the adjustment message.

Content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

The receiver 1003 is further configured to: after the mobile node is registered with the network, receive packet data sent by the mobile node.

The processor 1001 is further configured to match a source address prefix included in the packet data with the first matching entry in the first flow entry in the MAG The transmitter 1002 is further configured to: when the matching succeeds, forward the packet data to the LMA through the tunnel between the MAG and the LMA according to the first flow entry, so that the LMA forwards the packet data to the network.

In this embodiment, a transmitter 1002 adds an L2 attach request message to a bearer message, and forwards the bearer message to an SDN controller, and then a processor 1001 establishes a tunnel on a MAG side and adjusts a flow entry of a mobile node according to a message for establishing a tunnel and a message for adjusting a flow entry of the mobile node that are sent by the SDN controller, so that the MAG does not need to negotiate with an LMA to establish the tunnel. In addition, in comparison with the prior art, the network element device MAG may perform an operation according to an instruction of the SDN controller, and therefore a complex control function is simplified, and the network element device MAG is applicable to any IP, thereby reducing costs in network construction.

Figure 11:
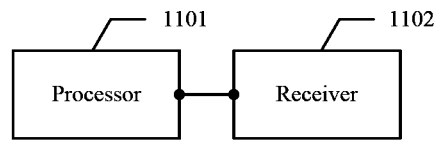
FIG. 11 is a schematic diagram of an embodiment of an LMA in the embodiments of the present invention.

The following further describes an LMA in an embodiment of the present invention. Referring to FIG. 11, FIG. 11 shows an embodiment of an LMA in the embodiments of the present invention. The LMA includes:

a processor 1101 and a receiver 1102.

The receiver 1102 is configured to: after an SDN controller receives a bearer message sent by a MAG, receive a message that is sent by the SDN controller and for establishing a tunnel between the MAG and the LMA, where the bearer message carries an L2 attach request message, the L2 attach request message is sent by a mobile node to the MAG to request to access the MAG, and the L2 attach request message includes an ID of the mobile node.

The processor 1101 is configured to complete establishment of the tunnel on the LMA side according to the message for establishing a tunnel between the MAG and the LMA.

The receiver 1102 is further configured to receive a message that is sent by the SDN controller and for adjusting a flow entry of the mobile node.

The processor 1101 is further configured to adjust, according to the message for adjusting a flow entry of the mobile node, a flow entry that is of the mobile node and stored in the LMA.

In addition, the receiver 1102 is further configured to receive an establishment message and an adjustment message that are sent by the SDN controller.

The processor 1101 is further configured to: establish a tunnel interface on the LMA side according to the establishment message, and add a second flow entry of the mobile node according to the adjustment message.

Content of the second flow entry includes: a third matching entry: a destination address prefix is an HNP(s) of the mobile node; and an operation corresponding to the third matching entry: forwarding through an LMA-MAG tunnel interface.

The receiver 1102 is further configured to receive packet data from a network after establishment of the tunnel between the MAG and the LMA succeeds and the mobile node receives a router advertisement message to register with the network.

The processor 1101 is further configured to: match a destination address prefix included in the packet data with the third matching entry in the second flow entry in the LMA, and when the matching unit successfully performs the matching, forward the packet data to the MAG through the tunnel between the MAG and the LMA according to the second flow entry, so that the MAG forwards the packet data to the mobile node according to a first flow entry in the MAG Content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link.

In this embodiment, a processor 1101 completes establishment of a tunnel on an LMA side according to a message that is sent by an SDN controller and for establishing a tunnel between a MAG and the LMA, and adjusts, according to a message that is sent by the SDN controller and for adjusting a flow entry of a mobile node, a flow entry that is of the mobile node and stored in the LMA, so that the MAG and the LMA do not need to negotiate with each other to establish the tunnel. The network element device LMA may perform an operation according to an instruction of the SDN controller, and therefore a complex control function is simplified, and the network element device LMA is applicable to any IP, thereby reducing costs in network construction.

Figure 12:
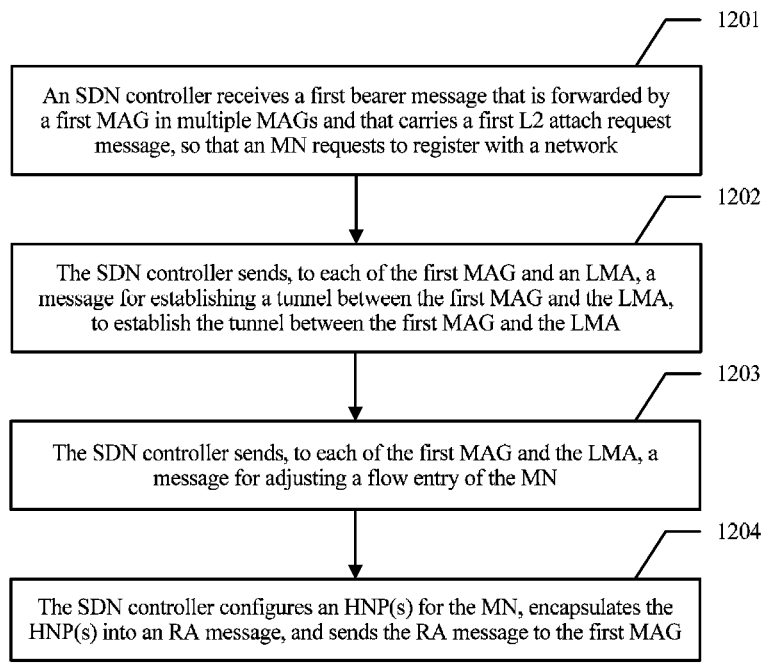
FIG. 12 is a schematic diagram of an embodiment of a binding registration method in the embodiments of the present invention.

The following describes a binding registration method performed by the foregoing SDN controller. Referring to FIG. 12, an embodiment of a binding registration method in the embodiments of the present invention includes the following steps:

1201. An SDN controller receives a first bearer message that is forwarded by a first MAG in multiple MAGs and that carries a first L2 attach request message, so that a mobile node requests to register with a network.

In this embodiment, the first L2 attach request message is sent by the mobile node to the first MAG to request to access the first MAG, and the first L2 attach request message includes an ID of the mobile node. In actual application, the mobile node determines, according to a requirement, to access the first MAG in the multiple MAGs, and in this case, the first MAG receives the first L2 attach request message. Because there is no matched flow entry in the first MAG, the first MAG sends the SDN controller the first bearer message that carries the first L2 attach request message.

1202. The SDN controller sends, to each of the first MAG and an LMA, a message for establishing a tunnel between the first MAG and the LMA, to establish the tunnel between the first MAG and the LMA.

1203. The SDN controller sends, to each of the first MAG and the LMA, a message for adjusting a flow entry of the mobile node.

In this embodiment, after step 1201 is performed, the SDN controller sends, to each of the first MAG and the LMA, the message for establishing a tunnel between the first MAG and the LMA. At the same time, the SDN controller may further send, to each of the first MAG and the LMA, the message for adjusting a flow entry of the mobile node. In actual application, the message for establishing a tunnel between the first MAG and the LMA may include configuration information for establishing the tunnel, and tunnels of different types have different configuration information. The message of the flow entry of the mobile node is a flow entry related to the mobile node, and the message for adjusting a flow entry of the mobile node is used to adjust flow entries of the mobile node in the first MAG and the LMA.

1204. The SDN controller configures an HNP(s) for the mobile node, encapsulates the HNP(s) into a router advertisement message, and sends the router advertisement message to the first MAG In this embodiment, when establishment of the tunnel between the first MAG and the LMA succeeds, the SDN controller configures the HNP(s) for the mobile node. In actual application, when the first MAG and the LMA each complete establishment of the tunnel and adjustment of the flow entries of the mobile node, it indicates that establishment of the tunnel between the first MAG and the LMA succeeds. In this case, the SDN controller may separately receive responses fed back by the first MAG and the LMA, so that the SDN controller is notified that establishment of the tunnel succeeds. Then the SDN controller encapsulates the HNP(s) into the router advertisement message, and sends the router advertisement message to the first MAG, so that the mobile node is registered with the network when the mobile node receives the router advertisement message from the first MAG In actual application, when the mobile node receives the router advertisement message from the first MAG, it indicates that the mobile node is registered with the network.

It should be noted that step 1202 to step 1204 are not limited to a sequence in this embodiment. In actual application, the sequence of performing operations in step 1202 to step 1204 by the SDN controller is not limited. The SDN controller may first perform step 1204 and then perform step 1202 and step 1203, or the SDN controller may simultaneously perform step 1202 and step 1203 and then perform step 1204.

In this embodiment, an SDN controller receives a first bearer message that is forwarded by a first MAG in multiple MAGs and that carries a first L2 attach request message, to request a mobile node to register with a network; the SDN controller sends, to each of the first MAG and an LMA, a message for establishing a tunnel between the first MAG and the LMA, to establish the tunnel between the first MAG and the LMA; the SDN controller sends, to each of the first MAG and the LMA, a message for adjusting a flow entry of the mobile node; and the SDN controller configures an HNP(s) for the mobile node, encapsulates the HNP(s) into a router advertisement message, and sends the router advertisement message to the first MAG. In this way, the SDN controller instructs the network element devices LMA and first MAG to establish the tunnel, and sends a flow entry of the mobile node to each of the first MAG and the LMA, so that the network element devices do not need to negotiate with each other. In addition, in comparison with the prior art, the network element devices LMA and MAG may perform operations according to instructions of the SDN controller, and therefore complex control functions are simplified, and the network element devices LMA and MAG are applicable to any IP, thereby reducing costs in network construction.

Figure 13:
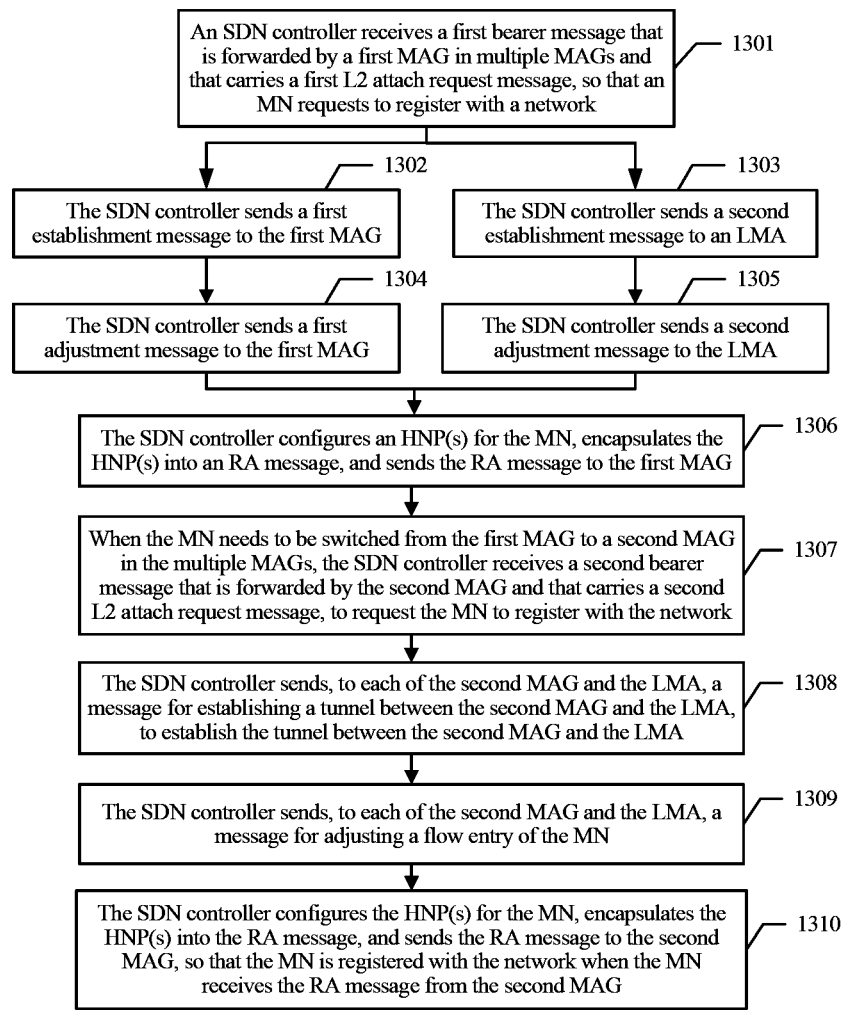
FIG. 13 is a schematic diagram of another embodiment of a binding registration method in the embodiments of the present invention.

The following uses a specific instance to describe a binding registration method in an embodiment of the present invention. Referring to FIG. 13, another embodiment of a binding registration method in the embodiments of the present invention includes the following steps:

1301. An SDN controller receives a first bearer message that is forwarded by a first MAG in multiple MAGs and that carries a first L2 attach request message, so that a mobile node requests to register with a network.

In this embodiment, the first L2 attach request message is sent by the mobile node to the first MAG to request to access the first MAG, and the first L2 attach request message includes an ID of the mobile node. In actual application, the mobile node determines, according to a requirement, to access the first MAG in the multiple MAGs, and in this case, the first MAG receives the first L2 attach request message. Because there is no matched flow entry in the first MAG, the first MAG sends the SDN controller the first bearer message that carries the first L2 attach request message.

In an actual application scenario, the L2 attach request message may be carried in a packet in form in this embodiment.

1302. The SDN controller sends a first establishment message to the first MAG

1303. The SDN controller sends a second establishment message to an LMA.

In this embodiment, the first establishment message is used to instruct the first MAG to establish a tunnel interface on the first MAG side, and the second establishment message is used to instruct the LMA to establish a tunnel interface on the LMA side. In actual application, the first establishment message includes configuration information for establishing the tunnel interface on the first MAG side, the second establishment message includes configuration information for establishing the tunnel interface on the LMA side, and tunnels of different types have different configuration information.

In an actual application scenario, establishment of an IP-in-IP tunnel is used as an example for description. In this case, the first establishment message and the second establishment message mainly include information in which an address Proxy-CoA 1 on the first MAG side and an address LMAA on the LMA side are encapsulated, where Proxy-CoA 1 is an address of the first MAG, and LMAA is an address of the LMA.

1304. The SDN controller sends a first adjustment message to the first MAG

1305. The SDN controller sends a second adjustment message to the LMA.

In this embodiment, the first adjustment message is used to instruct the first MAG to add a first flow entry of the mobile node, and the second adjustment message is used to instruct the LMA to add a second flow entry of the mobile node. The first flow entry is used to instruct the first MAG to forward data according to content of the first flow entry, and the second flow entry is used to instruct the LMA to forward data according to content of the second flow entry. The content of the first flow entry includes: a first matching entry: a source address prefix is an HNP(s) of the mobile node; an operation corresponding to the first matching entry: forwarding through a first MAG-LMA tunnel interface; a second matching entry: a destination address prefix is the HNP(s) of the mobile node; and an operation corresponding to the second matching entry: forwarding to a mobile node interface link. The content of the second flow entry includes: a third matching entry: a destination address prefix is the HNP(s) of the mobile node; and an operation corresponding to the third matching entry: forwarding through an LMA-first MAG tunnel interface.

1306. The SDN controller configures an HNP(s) for the mobile node, encapsulates the HNP(s) into a router advertisement message, and sends the router advertisement message to the first MAG In this embodiment, if establishment of the tunnel between the first MAG and the LMA succeeds, the SDN controller configures the HNP(s) for the mobile node. In actual application, when the first MAG and the LMA each complete establishment of the tunnel and adjustment of the flow entries of the mobile node, it indicates that establishment of the tunnel between the first MAG and the LMA succeeds. In this case, the SDN controller may separately receive responses fed back by the first MAG and the LMA, so that the SDN controller is notified that establishment of the tunnel succeeds. Then the SDN controller encapsulates the HNP(s) into the router advertisement message, and sends the router advertisement message to the first MAG, so that the mobile node is registered with the network when the mobile node receives the router advertisement message from the first MAG In actual application, when the mobile node receives the router advertisement message from the first MAG, it indicates that the mobile node is registered with the network.

In actual application, if the mobile node does not receive the router advertisement message, the mobile node may send an RS message to the first MAG to request to acquire the HNP(s), and then the first MAG may forward the received RS message to the SDN controller, so that the SDN controller delivers the HNP(s).

1307. When the mobile node needs to be switched from the first MAG to a second MAG in the multiple MAGs, the SDN controller receives a second bearer message that is forwarded by the second MAG and that carries a second L2 attach request message, to request the mobile node to register with the network.

In this embodiment, the second L2 attach request message is sent by the mobile node to the second MAG to request to access the second MAG, and the second L2 attach request message includes the ID of the mobile node. In actual application, the mobile node may be switched to the second MAG in the multiple MAGs, and in this case, the second MAG receives the second L2 attach request message. Because there is no matched flow entry in the second MAG, the second MAG sends the SDN controller the second bearer message that carries the second L2 attach request message.

In an actual application scenario, the L2 attach request message may be carried in a packet in form in this embodiment.

1308. The SDN controller sends, to each of the second MAG and the LMA, a message for establishing a tunnel between the second MAG and the LMA, to establish the tunnel between the second MAG and the LMA.

In this embodiment, the message for establishing a tunnel between the second MAG and the LMA may include configuration information for establishing the tunnel, and tunnels of different types have different configuration information.

Specifically, the SDN controller sends a third establishment message to the second MAG, where the third establishment message is used to instruct the second MAG to establish a tunnel interface on the second MAG side, and the third establishment message includes configuration information for establishing the tunnel interface on the second MAG side.

The SDN controller sends a fourth establishment message to the LMA, where the fourth establishment message is used to instruct the LMA to establish a tunnel interface on the LMA side, and the fourth establishment message includes configuration information for establishing the tunnel interface on the LMA side.

In an actual application scenario, establishment of an IP-in-IP tunnel is used as an example for description. In this case, the third establishment message and the fourth establishment message mainly include information in which an address Proxy-CoA 2 on the second MAG side and the address LMAA on the LMA side are encapsulated, where Proxy-CoA 2 is an address of the second MAG, and LMAA is the address of the LMA.

In actual application, the original tunnel between the first MAG and the LMA is changed to the tunnel between the second MAG and the LMA. In this case, the SDN controller may send a tunnel teardown instruction to each of the first MAG and the LMA, to tear down the tunnel between the first MAG and the LMA.

1309. The SDN controller sends, to each of the second MAG and the LMA, the message for adjusting a flow entry of the mobile node.

In this embodiment, the SDN controller sends, to each of the second MAG and the LMA, the message for adjusting a flow entry of the mobile node. In actual application, the message of the flow entry of the mobile node is a flow entry related to the mobile node, and the message for adjusting a flow entry of the mobile node is used to adjust flow entries of the mobile node in the first MAG and the LMA. Specifically, the SDN controller sends a third adjustment message to the second MAG, where the third adjustment message is used to instruct the second MAG to add a third flow entry of the mobile node. Content of the third flow entry includes: a fourth matching entry: a source address prefix is the HNP(s) of the mobile node; an operation corresponding to the fourth matching entry: forwarding through a second MAG-LMA tunnel interface; a fifth matching entry: a destination address prefix is the HNP(s) of the mobile node; and an operation corresponding to the fifth matching entry: forwarding to the mobile node interface link. The SDN controller sends a fourth adjustment message to the LMA, where the fourth adjustment message is used to instruct the LMA to add a fourth flow entry of the mobile node. The third flow entry is used to instruct the second MAG to forward data according to the content of the third flow entry, and the fourth flow entry is used to instruct the LMA to forward data according to content of the fourth flow entry. The content of the fourth flow entry includes: a sixth matching entry: a destination address prefix is the HNP(s) of the mobile node; and an operation corresponding to the sixth matching entry: forwarding through an LMA-second MAG tunnel interface.

1310. If establishment of the tunnel between the second MAG and the LMA succeeds, the SDN controller configures the HNP(s) for the mobile node, encapsulates the HNP(s) into the router advertisement message, and sends the router advertisement message to the second MAG, so that the mobile node is registered with the network when the mobile node receives the router advertisement message from the second MAG.

In this embodiment, if establishment of the tunnel between the second MAG and the LMA succeeds, the SDN controller configures the HNP(s) for the mobile node. In actual application, when the second MAG and the LMA each complete establishment of the tunnel and adjustment of the flow entries of the mobile node, it indicates that establishment of the tunnel between the second MAG and the LMA succeeds. In this case, the SDN controller may separately receive responses fed back by the second MAG and the LMA, so that the SDN controller is notified that establishment of the tunnel succeeds; and encapsulate the HNP(s) into the router advertisement message, and send the router advertisement message to the second MAG, so that the mobile node is registered with the network when the mobile node receives the router advertisement message from the second MAG In this embodiment, an SDN controller instructs network element devices LMA and first MAG to establish a tunnel, and sends a flow entry of a mobile node to each of the first MAG and the LMA, so that the network element devices do not need to perform complex tunnel parameter negotiation with each other. In addition, in comparison with the prior art, the network element devices LMA and MAG may perform operations according to instructions of the SDN controller without complex control functions, and therefore the network element devices LMA and MAG are applicable to any IP, thereby reducing costs in network construction. When the mobile node needs to be switched from the first MAG to a second MAG, the SDN controller may further instruct the network element devices LMA and second MAG to establish a tunnel, and send a flow entry of the mobile node to each of the second MAG and the LMA, and therefore the LMA and a different MAG do not need to perform a frequent and complex signaling interworking process when the mobile node moves and is switched to the different MAG, thereby increasing a processing speed of the network element device, and improving network bandwidth utilization.

Figure 14:
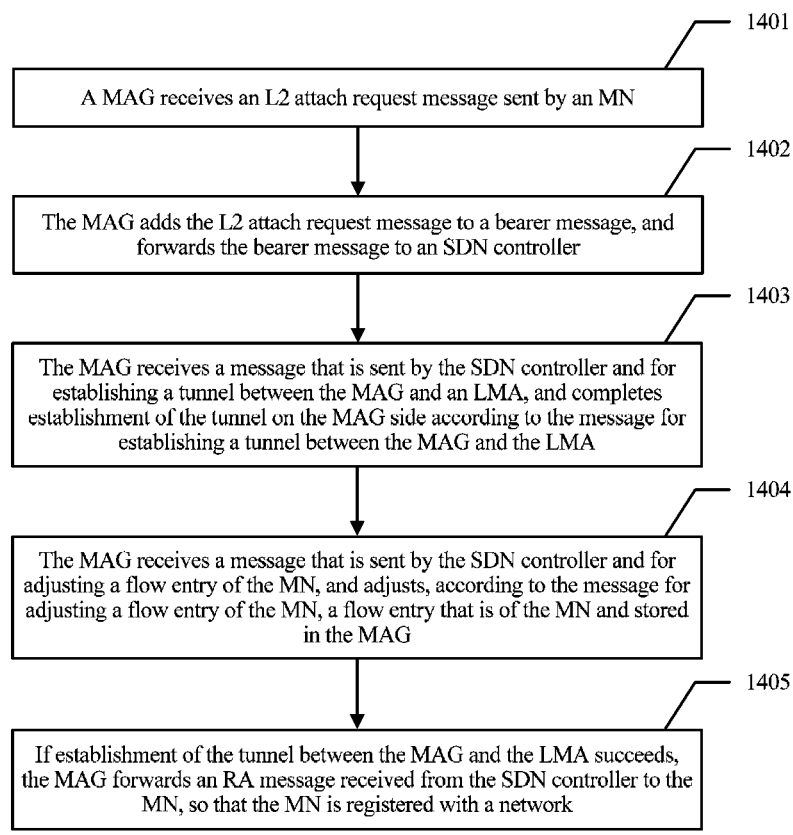
FIG. 14 is a schematic diagram of an embodiment of a data forwarding method in the embodiments of the present invention.

The following describes a data forwarding method performed by the foregoing MAG Referring to FIG. 14, an embodiment of a data forwarding method in the embodiments of the present invention includes the following steps:

1401. A MAG receives an L2 attach request message sent by a mobile node.

In this embodiment, the L2 attach request message includes an ID of the mobile node. In actual application, the mobile node sends the L2 attach request message to the MAG so as to access the MAG

1402. The MAG adds the L2 attach request message to a bearer message, and forwards the bearer message to an SDN controller.

In this embodiment, because there is no matched flow entry when the MAG receives the L2 attach request message, the MAG may add the L2 attach request message to the bearer message, and forward the bearer message to the SDN controller.

1403. The MAG receives a message that is sent by the SDN controller and for establishing a tunnel between the MAG and an LMA, and completes establishment of the tunnel on the MAG side according to the message for establishing a tunnel between the MAG and the LMA.

In this embodiment, after step 1402 is performed, the MAG may receive the message that is sent by the SDN controller and for establishing a tunnel between the MAG and the LMA, and then after receiving the message for establishing a tunnel between the MAG and the LMA, the MAG completes establishment of the tunnel on the MAG side according to the message for establishing a tunnel between the MAG and the LMA. In actual application, the SDN controller simultaneously sends the LMA the message for establishing a tunnel between the LMA and the MAG, and the LMA may complete establishment of the tunnel on the LMA side according to the message for establishing a tunnel between the LMA and the MAG In actual application, the message for establishing a tunnel between the MAG and the LMA may include configuration information for establishing the tunnel, and tunnels of different types have different configuration information.

1404. The MAG receives a message that is sent by the SDN controller and for adjusting a flow entry of the mobile node, and adjusts, according to the message for adjusting a flow entry of the mobile node, a flow entry that is of the mobile node and stored in the MAG In this embodiment, at the same time of performing step 1403, the MAG may further receive the message that is sent by the SDN controller and for adjusting a flow entry of the mobile node, and then the MAG may adjust, according to the message for adjusting a flow entry of the mobile node, the flow entry that is of the mobile node and stored in the MAG. In actual application, the message of the flow entry of the mobile node is a flow entry related to the mobile node. The SDN controller may also send the LMA the message for adjusting a flow entry of the mobile node, so that the LMA adjusts, according to the message for adjusting a flow entry of the mobile node, a flow entry that is of the mobile node and stored in the LMA.

1405. If establishment of the tunnel between the MAG and the LMA succeeds, the MAG forwards a router advertisement message received from the SDN controller to the mobile node, so that the mobile node is registered with a network.

In this embodiment, the router advertisement message includes an HNP(s) configured by the SDN controller for the mobile node. In actual application, after the MAG completes operations in step 1403 and step 1404, the MAG may feed back a response to the SDN controller. Certainly, after the LMA completes establishment of the tunnel on the LMA side and adjustment of the flow entry that is of the mobile node and stored in the LMA, the LMA may also feed back a response to the SDN controller, to notify the SDN controller that establishment of the tunnel between the MAG and the LMA succeeds. Then the MAG may receive the router advertisement message sent by the SDN controller, and forward the router advertisement message received from the SDN controller to the mobile node, so that the mobile node is registered with the network.

In this embodiment, a MAG is responsible for adding an L2 attach request message to a bearer message, and forwarding the bearer message to an SDN controller, and then the MAG completes establishment of a tunnel on the MAG side according to a message that is sent by the SDN controller and for establishing a tunnel between the MAG and an LMA, and adjusts, according to a message that is sent by the SDN controller and for adjusting a flow entry of an mobile node, a flow entry that is of the mobile node and stored in the MAG, so that the MAG and the LMA do not need to negotiate with each other to establish the tunnel. In addition, in comparison with the prior art, the network element device MAG may perform an operation according to an instruction of the SDN controller, and therefore a complex control function is simplified, and the network element device MAG is applicable to any IP, thereby reducing costs in network construction.

Figure 15:
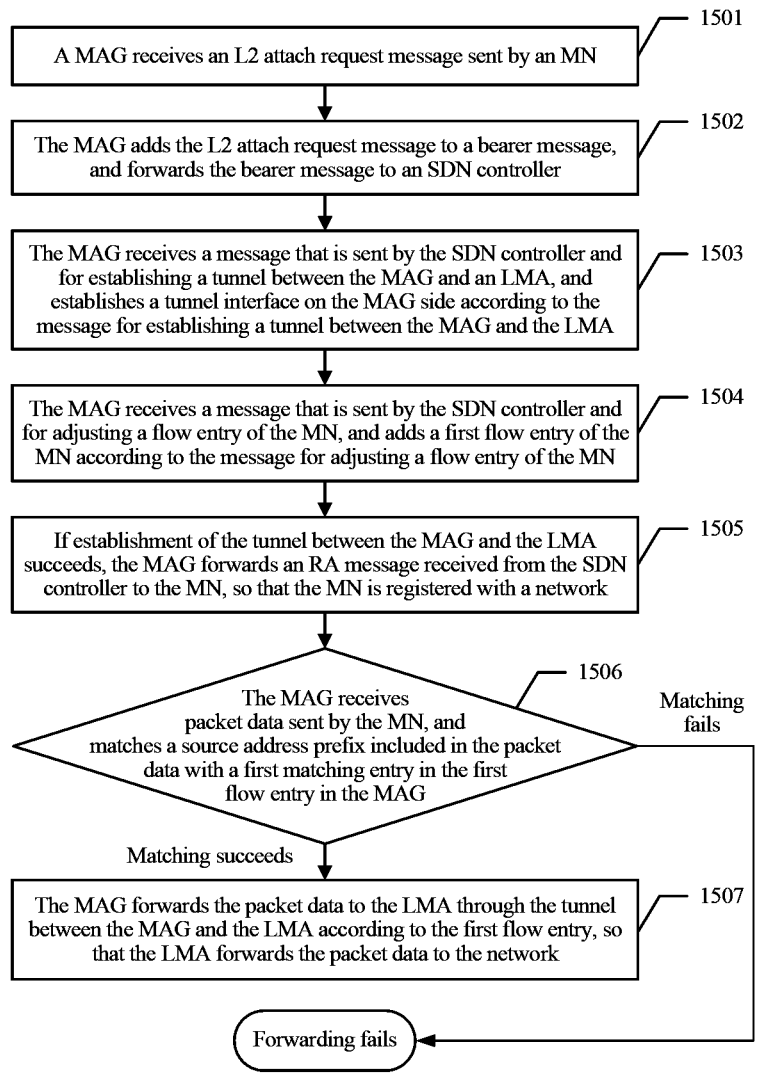
FIG. 15 is a schematic diagram of another embodiment of a data forwarding method in the embodiments of the present invention.

The following uses a specific instance to describe a data forwarding method in an embodiment of the present invention. Referring to FIG. 15, another embodiment of a data forwarding method in the embodiments of the present invention includes the following steps:

1501. A MAG receives an L2 attach request message sent by a mobile node.

In this embodiment, the L2 attach request message includes an ID of the mobile node. In actual application, the mobile node sends the L2 attach request message to the MAG so as to access the MAG

1502. The MAG adds the L2 attach request message to a bearer message, and forwards the bearer message to an SDN controller.

In this embodiment, because there is no matched flow entry when the MAG receives the L2 attach request message, the MAG may add the L2 attach request message to the bearer message, and forward the bearer message to the SDN controller.

1503. The MAG receives a message that is sent by the SDN controller and for establishing a tunnel between the MAG and an LMA, and establishes a tunnel interface on the MAG side according to the message for establishing a tunnel between the MAG and the LMA.

In this embodiment, the MAG receives the message that is sent by the SDN controller and for establishing a tunnel between the MAG and the LMA, and establishes the tunnel interface on the MAG side according to the message for establishing a tunnel between the MAG and the LMA. In actual application, the message for establishing a tunnel between the MAG and the LMA includes configuration information for establishing the tunnel interface on the MAG side, and tunnels of different types have different configuration information.

Certainly, in actual application, the network element device LMA may also receive another message that is sent by the SDN controller and for establishing a tunnel between the MAG and the LMA, and the LMA establishes a tunnel interface on the LMA side according to the another message for establishing a tunnel between the MAG and the LMA, where the another message for establishing a tunnel between the MAG and the LMA includes configuration information for establishing the tunnel interface on the LMA side.

1504. The MAG receives a message that is sent by the SDN controller and for adjusting a flow entry of the mobile node, and adds a first flow entry of the mobile node according to the message for adjusting a flow entry of the mobile node.

In this embodiment, content of the first flow entry includes: a first matching entry: a source address prefix is an HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link. In actual application, the MAG may forward data according to the first flow entry.

In actual application, the network element device LMA may also receive another message that is sent by the SDN controller and for adjusting a flow entry of the mobile node, and the LMA may add a second flow entry according to the another message for adjusting a flow entry of the mobile node. Content of the second flow entry includes: a third matching entry: a destination address prefix is the HNP(s) of the mobile node; and an operation corresponding to the third matching entry: forwarding through an LMA-MAG tunnel interface.

1505. If establishment of the tunnel between the MAG and the LMA succeeds, the MAG forwards a router advertisement message received from the SDN controller to the mobile node, so that the mobile node is registered with a network.

In this embodiment, the router advertisement message includes an HNP(s) configured by the SDN controller for the mobile node. In actual application, after the MAG completes operations in step 1503 and step 1504, the MAG may feed back a response to the SDN controller. Certainly, after the LMA completes establishment of the tunnel interface on the LMA side and adjustment of a flow entry that is of the mobile node and stored in the LMA, the LMA may also feed back a response to the SDN controller, to notify the SDN controller that establishment of the tunnel between the MAG and the LMA succeeds. Then the MAG may receive the router advertisement message sent by the SDN controller, and forward the router advertisement message received from the SDN controller to the mobile node, so that the mobile node is registered with the network.

In actual application, if the mobile node does not receive the router advertisement message, the mobile node may send an RS message to the first MAG to request to acquire the HNP(s), and then the first MAG may forward the received RS message to the SDN controller, so that the SDN controller delivers the HNP(s).

1506. After the mobile node is registered with the network, the MAG receives packet data sent by the mobile node, matches a source address prefix included in the packet data with a first matching entry in the first flow entry in the MAG, and if the matching succeeds, performs step 1507; or if the matching fails, it indicates that forwarding of the packet data fails.

1507. The MAG forwards the packet data to the LMA through the tunnel between the MAG and the LMA according to the first flow entry, so that the LMA forwards the packet data to the network.

In this embodiment, after the mobile node is registered with the network, the mobile node needs to send the packet data to the network. In this case, the MAG may receive the packet data sent by the mobile node, and match the source address prefix included in the packet data with the first matching entry in the first flow entry in the MAG The MAG forwards the packet data to the LMA through the tunnel between the MAG and the LMA according to the first flow entry. For example, content of the first flow entry in step 1504 includes: a first matching entry: a source address prefix is an HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link. If the source address prefix included in the packet data received by the MAG is the HNP(s) of the mobile node, the MAG may determine that matching with the source address prefix of the first matching entry in the first flow entry succeeds, and then the MAG may perform the operation corresponding to the first matching entry in the first flow entry, that is, forwarding through the MAG-LMA tunnel interface. In this case, the MAG needs to forward the packet data to the LMA through the MAG-LMA tunnel by using an address of the MAG as a source address and an address of the LMA as a destination address.

In actual application, the LMA forwards the packet data to the network without a flow entry of the mobile node, and the LMA needs to forward the packet data to the network according to another flow entry. How to forward the packet data to the network according to the another flow entry is the prior art, and no further details are provided herein.

In this embodiment, a MAG is responsible for adding an L2 attach request message to a bearer message, and forwarding the bearer message to an SDN controller, and then the MAG establishes a tunnel on the MAG side according to a message that is sent by the SDN controller and for establishing a tunnel between the MAG and an LMA, and adds a first flow entry of a mobile node according to a message that is sent by the SDN controller and for adjusting a flow entry of the mobile node, so that the MAG and the LMA do not need to negotiate with each other. In addition, in comparison with the prior art, the network element device MAG may perform an operation according to an instruction of the SDN controller without a complex control function, and therefore the network element device MAG is applicable to any IP, thereby reducing costs in network construction. When the mobile node has packet data that needs to be sent to a network, the MAG may forward the packet data to the LMA according to the first flow entry delivered by the SDN controller, so that the LMA forwards the packet data to the network, and the LMA and the MAG do not need to negotiate with each other to forward the packet data, which reduces complex signaling interworking performed when the LMA and the MAG forward the packet data, thereby increasing a processing speed of the network element device, and improving network bandwidth utilization.

Figure 16:
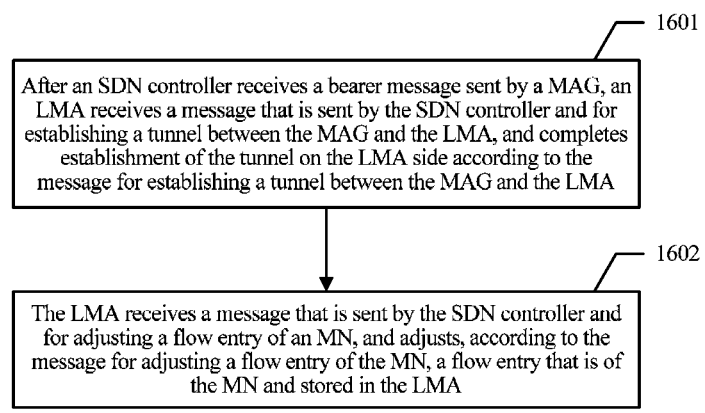
FIG. 16 is a schematic diagram of an embodiment of a data forwarding method in the embodiments of the present invention.

The following describes a data forwarding method performed by the foregoing LMA. Referring to FIG. 16, an embodiment of a data forwarding method in the embodiments of the present invention includes the following steps:

1601. After an SDN controller receives a bearer message sent by a MAG, an LMA receives a message that is sent by the SDN controller and for establishing a tunnel between the MAG and the LMA, and completes establishment of the tunnel on the LMA side according to the message for establishing a tunnel between the MAG and the LMA.

In this embodiment, the bearer message carries an L2 attach request message, the L2 attach request message is sent by a mobile node to the MAG to request to access the MAG, and the L2 attach request message includes an ID of the mobile node. In actual application, the MAG may also receive another message that is sent by the SDN controller and for establishing a tunnel between the MAG and the LMA, and complete establishment of the tunnel on the MAG side according to the another message for establishing a tunnel between the MAG and the LMA.

In actual application, the message for establishing a tunnel between the MAG and the LMA may include configuration information for establishing the tunnel, and tunnels of different types have different configuration information.

1602. The LMA receives a message that is sent by the SDN controller and for adjusting a flow entry of a mobile node, and adjusts, according to the message for adjusting a flow entry of the mobile node, a flow entry that is of the mobile node and stored in the LMA.

In this embodiment, at the same time of performing step 1601, the LMA receives the message that is sent by the SDN controller and for adjusting a flow entry of the mobile node. In actual application, the message of the flow entry of the mobile node is a flow entry related to the mobile node, and the SDN controller may also send the MAG the message for adjusting a flow entry of the mobile node, so that the MAG adjusts, according to the message for adjusting a flow entry of the mobile node, a flow entry that is of the mobile node and stored in the MAG Further, after the LMA completes operations in step 1601 and step 1602, the LMA may feed back a response to the SDN controller. Certainly, after the MAG completes establishment of the tunnel on the MAG side and adjustment of the flow entry that is of the mobile node and stored in the MAG, the MAG may also feed back a response to the SDN controller, to notify the SDN controller that establishment of the tunnel between the MAG and the LMA succeeds, and then the SDN controller forwards a router advertisement message to the mobile node by using the MAG. After the mobile node receives the router advertisement message, it indicates that the mobile node is registered with the network, where the router advertisement message includes an HNP(s) configured by the SDN controller for the mobile node.

In this embodiment, an LMA completes establishment of a tunnel on the LMA side according to a message that is sent by an SDN controller and for establishing a tunnel between a MAG and the LMA, and adjusts, according to a message that is sent by the SDN controller and for adjusting a flow entry of a mobile node, a flow entry that is of the mobile node and stored in the LMA, so that the MAG and the LMA do not need to negotiate with each other to establish the tunnel. The network element device LMA may perform an operation according to an instruction of the SDN controller, and therefore a complex control function is simplified, and the network element device LMA is applicable to any IP, thereby reducing costs in network construction.

Figure 17:
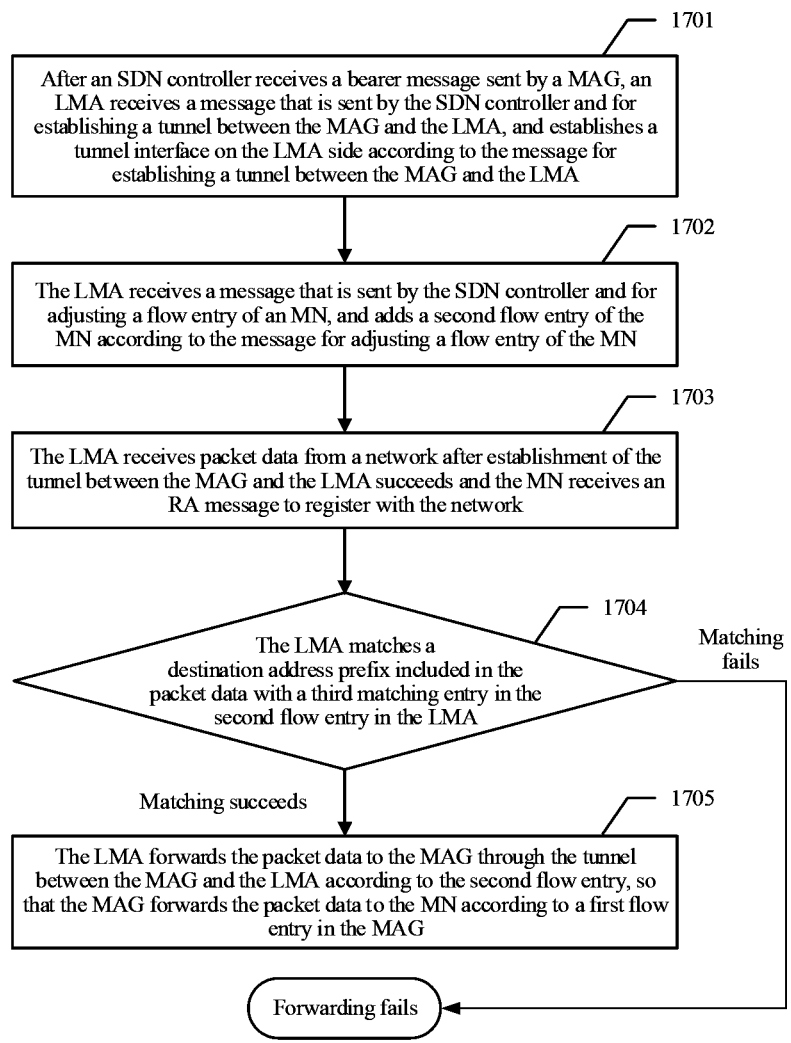
FIG. 17 is a schematic diagram of another embodiment of a data forwarding method in the embodiments of the present invention.

The following uses a specific instance to describe a data forwarding method in an embodiment of the present invention. Referring to FIG. 17, another embodiment of a data forwarding method in the embodiments of the present invention includes the following steps:

1701. After an SDN controller receives a bearer message sent by a MAG, an LMA receives a message that is sent by the SDN controller and for establishing a tunnel between the MAG and the LMA, and establishes a tunnel interface on the LMA side according to the message for establishing a tunnel between the MAG and the LMA.

In this embodiment, the bearer message carries an L2 attach request message, the L2 attach request message is sent by a mobile node to the MAG to request to access the MAG, and the L2 attach request message includes an ID of the mobile node. In actual application, the message for establishing a tunnel between the MAG and the LMA includes configuration information for establishing the tunnel interface on the LMA side, and tunnels of different types have different configuration information.

In actual application, the network element device MAG may also receive another message that is sent by the SDN controller and for establishing a tunnel between the MAG and the LMA, and complete establishment of a tunnel interface on the MAG side according to the another message for establishing a tunnel between the MAG and the LMA, where the another message for establishing a tunnel between the MAG and the LMA includes configuration information for establishing the tunnel interface on the MAG side.

1702. The LMA receives a message that is sent by the SDN controller and for adjusting a flow entry of the mobile node, and adds a second flow entry of the mobile node according to the message for adjusting a flow entry of the mobile node.

In this embodiment, content of the second flow entry includes: a third matching entry: a destination address prefix is an HNP(s) of the mobile node; and an operation corresponding to the third matching entry: forwarding through an LMA-MAG tunnel interface. In actual application, the LMA may forward data according to the second flow entry, and the network element device MAG may also add a first flow entry according to an instruction of the SDN controller.

Further, after the LMA completes operations in step 1701 and step 1702, the LMA may feed back a response to the SDN controller. Certainly, after the MAG completes establishment of the tunnel interface on the MAG side and adding of the first flow entry, the MAG may also feed back a response to the SDN controller, to notify the SDN controller that establishment of the tunnel between the MAG and the LMA succeeds. Then the SDN controller forwards a router advertisement message to the mobile node by using the MAG, where the router advertisement message includes an HNP(s) configured by the SDN controller for the mobile node.

In actual application, if the mobile node does not receive the router advertisement message, the mobile node may send an RS message to the first MAG to request to acquire the HNP(s), and then the first MAG may forward the received RS message to the SDN controller, so that the SDN controller delivers the HNP(s).

1703. The LMA receives packet data from a network after establishment of the tunnel between the MAG and the LMA succeeds and the mobile node receives a router advertisement message to register with the network.

In this embodiment, after the mobile node is registered with the network, the LMA may receive the packet data from the network.

1704. The LMA matches a destination address prefix included in the packet data with a third matching entry in the second flow entry in the LMA, and if the matching succeeds, performs step 1705; or if the matching fails, it indicates that forwarding of the packet data fails.

1705. The LMA forwards the packet data to the MAG through the tunnel between the MAG and the LMA according to the second flow entry, so that the MAG forwards the packet data to the mobile node according to a first flow entry in the MAG In this embodiment, content of the first flow entry includes: a first matching entry: a source address prefix is the HNP(s) of the mobile node; an operation corresponding to the first matching entry: forwarding through a MAG-LMA tunnel interface; a second matching entry: a destination address prefix is the HNP(s) of the mobile node; and an operation corresponding to the second matching entry: forwarding to a mobile node interface link. The LMA forwards the packet data to the MAG through the tunnel between the MAG and the LMA according to the second flow entry, so that the MAG forwards the packet data to the mobile node according to the first flow entry in the MAG. For example, content of the second flow entry in step 1702 includes: a third matching entry: a destination address prefix is an HNP(s) of the mobile node; and an operation corresponding to the third matching entry: forwarding through an LMA-MAG tunnel interface. If the destination address prefix included in the packet data received by the LMA is the HNP(s) of the mobile node, the LMA may determine that matching with the destination address prefix of the third matching entry in the second flow entry succeeds, and then the LMA may perform the operation corresponding to the third matching entry in the second flow entry, that is, forwarding through the LMA-MAG tunnel interface. In this case, the LMA forwards the packet data to the MAG through the LMA-MAG tunnel by using an address of the LMA as a source address and an address of the MAG as a destination address.

Further, in actual application, after receiving the packet data, the MAG may forward the packet data to the mobile node according to the first flow entry in the MAG. In this case, the MAG needs to match the second matching entry in the first flow entry according to the destination address prefix included in the packet data, and after the matching succeeds, forward the packet data to the mobile node according to the first flow entry in the MAG Specifically, if the destination address prefix included in the packet data is the HNP(s) of the mobile node, it indicates that matching with the second matching entry in the first flow entry succeeds.

In this embodiment, an LMA establishes a tunnel interface on the LMA side according to a message that is sent by an SDN controller and for establishing a tunnel between a MAG and the LMA, and adds a second flow entry of a mobile node according to a message that is sent by the SDN controller and for adjusting a flow entry of the mobile node, so that the MAG and the LMA do not need to negotiate with each other to establish the tunnel. The network element device LMA may perform an operation according to an instruction of the SDN controller without a complex control function, and therefore the network element device LMA is applicable to any IP, thereby reducing costs in network construction. When a network has packet data that needs to be sent to the mobile node, the LMA may forward the packet data to the MAG according to the second flow entry delivered by the SDN controller, so that the MAG sends the packet data to the mobile node according to a first flow entry delivered by the SDN controller, and the LMA and the MAG do not need to negotiate with each other to forward the packet data, which reduces complex signaling interworking performed when the LMA and the MAG forward the packet data, thereby increasing a processing speed of the network element device, and improving network bandwidth utilization.

In addition, it should be noted that in the embodiments provided in this application, understandably the disclosed system, apparatus, and method may be implemented in other manners. For example, the foregoing described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention. Additionally, statements made herein characterizing the invention refer to an embodiment of the invention and not necessarily all embodiments.

What is claimed is:

1. A software defined networking (SDN) controller, wherein the SDN controller comprises:
 a processor, configured for processing a message received from a network element;
 a receiver, configured to receive a first bearer message that is forwarded by a first mobile access gateway (MAG) of multiple MAGs and that carries a first L2 attach request message, so that a mobile node requests to register with a network, wherein the first L2 attach request message is sent by the mobile node to the first MAG to request to access the first MAG, and the first L2 attach request message comprises an ID of the mobile node; and a transmitter, configured to send, to each of the first MAG and a local mobility anchor (LMA), a message for establishing a tunnel between the first MAG and the LMA, and to send, to each of the first MAG and the LMA, a message for adjusting a flow entry of the mobile node;

wherein the processor is further configured to, when establishment of the tunnel between the first MAG and the LMA succeeds, configure home network prefix(es) (HNP(s)) for the mobile node, and encapsulate the HNP(s) into a router advertisement message; and wherein the transmitter is further configured to send the router advertisement message to the first MAG, so that the mobile node is registered with the network when the mobile node receives the router advertisement message from the first MAG.

2. The SDN controller according to claim 1, wherein the transmitter is further configured to send a first establishment message to the first MAG, wherein the first establishment message is configured to instruct the first MAG to establish a tunnel interface on the first MAG side, and the first establishment message comprises configuration information for establishing the tunnel interface on the first MAG side;

wherein the transmitter is further configured to send a second establishment message to the LMA, wherein the second establishment message is configured to instruct the LMA to establish a tunnel interface on the LMA side, and the second establishment message comprises configuration information for establishing the tunnel interface on the LMA side;

wherein the transmitter is further configured to send a first adjustment message to the first MAG, wherein the first adjustment message is configured to instruct the first MAG to add a first flow entry of the mobile node; and wherein the transmitter is further configured to send a second adjustment message to the LMA, wherein the second adjustment message is configured to instruct the LMA to add a second flow entry of the mobile node.

3. The SDN controller according to claim 2, wherein the first flow entry is configured to instruct the first MAG to forward data according to content of the first flow entry; and wherein the second flow entry is configured to instruct the LMA to forward data according to content of the second flow entry.

4. The SDN controller according to claim 3, wherein the content of the first flow entry comprises: a first matching entry indicating that a source address prefix is the HNP(s) of the mobile node, wherein an operation corresponding to the first matching entry includes forwarding data through a first MAG-LMA tunnel interface; and a second matching entry indicating that a destination address prefix is the HNP(s) of the mobile node, wherein an operation corresponding to the second matching entry includes forwarding data to a mobile node interface link; and wherein the content of the second flow entry comprises: a third matching entry indicating that a destination address prefix is the HNP(s) of the mobile node, wherein an operation corresponding to the third matching entry includes forwarding data through an LMA-first MAG tunnel interface.

5. The SDN controller according to claim 1, wherein the receiver is further configured to, when the mobile node needs to be switched from the first MAG to a second MAG of the multiple MAGs, receive a second bearer message that is forwarded by the second MAG and that carries a second L2 attach request message, so that the mobile node requests to register with the network, wherein the second L2 attach request message is sent by the mobile node to the second MAG to request to access the second MAG, and the second L2 attach request message comprises the ID of the mobile node;

wherein the transmitter is further configured to send, to each of the second MAG and the LMA, a message for establishing a tunnel between the second MAG and the LMA, to establish the tunnel between the second MAG and the LMA;

wherein the transmitter is further configured to send, to each of the second MAG and the LMA, the message for adjusting a flow entry of the mobile node;

wherein the processor is further configured to, when establishment of the tunnel between the second MAG and the LMA succeeds, configure the HNP(s) for the mobile node, and encapsulate the HNP(s) into the router advertisement message; and wherein the transmitter is further configured to send the router advertisement message to the second MAG when establishment of the tunnel between the second MAG and the LMA succeeds, so that the mobile node is registered with the network when the mobile node receives the router advertisement message from the second MAG, wherein the router advertisement message comprises the HNP(s) configured by the SDN controller for the mobile node.

6. The SDN controller according to claim 5, wherein the transmitter is configured to send a third establishment message to the second MAG, wherein the third establishment message is configured to instruct the second MAG to establish a tunnel interface on the second MAG side, and the third establishment message comprises configuration information for establishing the tunnel interface on the second MAG side;

wherein the transmitter is further configured to send a fourth establishment message to the LMA, wherein the fourth establishment message is configured to instruct the LMA to establish a tunnel interface on the LMA side, and the fourth establishment message comprises configuration information for establishing the tunnel interface on the LMA side;

wherein the transmitter is configured to send a third adjustment message to the second MAG, wherein the third adjustment message is configured to instruct the second MAG to add a third flow entry of the mobile node; and wherein the transmitter is configured to send a fourth adjustment message to the LMA, wherein the fourth adjustment message is configured to instruct the LMA to add a fourth flow entry of the mobile node.

7. The SDN controller according to claim 6, wherein the third flow entry is configured to instruct the second MAG to forward data according to content of the third flow entry; and wherein the fourth flow entry is configured to instruct the LMA to forward data according to content of the fourth flow entry.

8. The SDN controller according to claim 7, wherein the content of the third flow entry comprises: a fourth matching entry indicating that a source address prefix is the HNP(s) of the mobile node, wherein an operation corresponding to the fourth matching entry includes forwarding data through a second MAG-LMA tunnel interface; and a fifth matching entry indicating that a destination address prefix is the HNP(s) of the mobile node, wherein an operation corresponding to the fifth matching entry includes forwarding data to a mobile node interface link; and wherein the content of the fourth flow entry comprises: a sixth matching entry indicating that a destination address prefix is the HNP(s) of the mobile node, wherein an operation corresponding to the sixth matching entry includes forwarding data through an LMA-second MAG tunnel interface.

9. A network system, comprising:
a software defined networking (SDN) controller;
a mobile node;
a mobile access gateway (MAG); and
a local mobility anchor (LMA);
   wherein the mobile node is configured to send an L2 attach request message to the MAG when the mobile node needs to access the MAG, wherein the L2 attach request message comprises an ID of the mobile node;
   wherein the MAG is configured to: add the received L2 attach request message to a bearer message, and forward the bearer message to the SDN controller;
   wherein the SDN controller is configured to: send, to each of the MAG and the LMA, a message for establishing a tunnel between the MAG and the LMA, and send, to each of the MAG and the LMA, a message for adjusting a flow entry of the mobile node;
   wherein the MAG is further configured to: complete establishment of the tunnel on the MAG side according to the received message for establishing a tunnel between the MAG and the LMA, and adjust, according to the received message for adjusting a flow entry of the mobile node, a flow entry that is of the mobile node and stored in the MAG;
   wherein the LMA is configured to: complete establishment of the tunnel on the LMA side according to the message for establishing a tunnel between the MAG and the LMA, and adjust, according to the message for adjusting a flow entry of the mobile node, a flow entry that is of the mobile node and stored in the LMA;
   wherein the SDN controller is further configured to: after establishment of the tunnel between the MAG and the LMA succeeds, configure home network prefix(es) (HNP(s)) for the mobile node, encapsulate the HNP(s) into a router advertisement message, and send the router advertisement message to the MAG; and
   wherein the mobile node is further configured to receive the router advertisement message forwarded by the MAG, to register with a network.

10. The system according to claim 9, wherein the SDN controller is further configured to: send a first establishment message and a first adjustment message to the MAG, and send a second establishment message and a second adjustment message to the LMA;
   wherein the MAG is configured to: establish a tunnel interface on the MAG side according to the received first establishment message, and add a first flow entry of the mobile node according to the first adjustment message; and
   wherein the LMA is configured to: establish a tunnel interface on the LMA side according to the received second establishment message, and add a second flow entry of the mobile node according to the second adjustment message.

11. The system according to claim 10, wherein content of the first flow entry comprises: a first matching entry indicating that a source address prefix is the HNP(s) of the mobile node, wherein an operation corresponding to the first matching entry includes forwarding data through a MAG-LMA tunnel interface; and a second matching entry indicating that a destination address prefix is the HNP(s) of the mobile node, wherein an operation corresponding to the second matching entry includes forwarding data to a mobile node interface link; and
   wherein content of the second flow entry comprises: a third matching entry indicating that a destination address prefix is the HNP(s) of the mobile node, wherein an operation corresponding to the third matching entry includes forwarding data through an LMA-MAG tunnel interface.

12. The system according to claim 11, wherein the mobile node is further configured to send packet data to the MAG after the mobile node is registered with the network;
   wherein the MAG is further configured to: match a source address prefix comprised in the received packet data with the first matching entry in the first flow entry in the MAG, and if the matching succeeds, forward the packet data to the LMA through the tunnel between the MAG and the LMA according to the first flow entry; and
   wherein the LMA is further configured to forward the received packet data to the network.

13. The system according to claim 11, wherein the LMA is further configured to: after the mobile node is registered with the network, receive packet data from the network, match a destination address prefix comprised in the packet data with the third matching entry in the second flow entry in the LMA, and if the matching succeeds, forward the packet data to the MAG through the tunnel between the MAG and the LMA according to the second flow entry; and
   wherein the MAG is further configured to: match the destination address prefix comprised in the packet data with the second matching entry in the first flow entry in the MAG, and if the matching succeeds, forward the packet data to the mobile node through the tunnel between the MAG and the LMA according to the first flow entry.

14. A binding registration method, wherein the method comprises:
   receiving, by a software defined networking (SDN) controller, a first bearer message that is forwarded by a first mobile access gateway (MAG) of multiple MAGs and that carries a first L2 attach request message, to request a mobile node to register with a network, wherein the first L2 attach request message is sent by the mobile node to the first MAG to request to access the first MAG, and the first L2 attach request message comprises an ID of the mobile node;
   sending, by the SDN controller, to each of the first MAG and a local mobility anchor (LMA), a message for establishing a tunnel between the first MAG and the LMA;
   sending, by the SDN controller to each of the first MAG and the LMA, a message for adjusting a flow entry of the mobile node; and
   in response to successful establishment of the tunnel between the first MAG and the LMA, configuring, by the SDN controller, home network prefix(es) (HNP(s)) for the mobile node, encapsulating the HNP(s) into a router advertisement message, and sending the router advertisement message to the first MAG, so that the mobile node is registered with the network when the mobile node receives the router advertisement message from the first MAG.

15. The method according to claim 14, wherein sending the message for establishing the tunnel between the first MAG and the LMA further comprises:

sending, by the SDN controller, a first establishment message to the first MAG, wherein the first establishment message is used to instruct the first MAG to establish a tunnel interface on the first MAG side, and the first establishment message comprises configuration information for establishing the tunnel interface on the first MAG side; and sending, by the SDN controller, a second establishment message to the LMA, wherein the second establishment message is used to instruct the LMA to establish a tunnel interface on the LMA side, and the second establishment message comprises configuration information for establishing the tunnel interface on the LMA side; and wherein sending the message for adjusting the flow entry of the mobile node further comprises:

sending, by the SDN controller, a first adjustment message to the first MAG, wherein the first adjustment message is used to instruct the first MAG to add a first flow entry of the mobile node; and sending, by the SDN controller, a second adjustment message to the LMA, wherein the second adjustment message is used to instruct the LMA to add a second flow entry of the mobile node.

16. The method according to claim 15, wherein the first flow entry is used to instruct the first MAG to forward data according to content of the first flow entry; and wherein the second flow entry is used to instruct the LMA to forward data according to content of the second flow entry.

17. The method according to claim 16, wherein the content of the first flow entry comprises: a first matching entry indicating that a source address prefix is the HNP(s) of the mobile node, wherein an operation corresponding to the first matching entry includes forwarding data through a first MAG-LMA tunnel interface; and a second matching entry indicating that a destination address prefix is the HNP(s) of the mobile node, wherein an operation corresponding to the second matching entry includes forwarding data to a mobile node interface link; and wherein the content of the second flow entry comprises: a third matching entry indicating that a destination address prefix is the HNP(s) of the mobile node, wherein an operation corresponding to the third matching entry includes forwarding data through an LMA-first MAG tunnel interface.

18. The method according to claim 14, wherein the method further comprises:

when the mobile node needs to be switched from the first MAG to a second MAG of the multiple MAGs, receiving, by the SDN controller, a second bearer message that is forwarded by the second MAG and that carries a second L2 attach request message, to request the mobile node to register with the network, wherein the second L2 attach request message is sent by the mobile node to the second MAG to request to access the second MAG, and the second L2 attach request message comprises the ID of the mobile node;

sending, by the SDN controller to each of the second MAG and the LMA, a message for establishing a tunnel between the second MAG and the LMA, to establish the tunnel between the second MAG and the LMA;

sending, by the SDN controller to each of the second MAG and the LMA, the message for adjusting a flow entry of the mobile node; and in response to successful establishment of the tunnel between the second MAG and the LMA, configuring, by the SDN controller, the HNP(s) for the mobile node, encapsulating the HNP(s) into the router advertisement message, and sending the router advertisement message to the second MAG, so that the mobile node is registered with the network when the mobile node receives the router advertisement message from the second MAG.

19. The method according to claim 18, wherein sending the message for establishing the tunnel between the second MAG and the LMA further comprises:

sending, by the SDN controller, a third establishment message to the second MAG, wherein the third establishment message is used to instruct the second MAG to establish a tunnel interface on the second MAG side, and the third establishment message comprises configuration information for establishing the tunnel interface on the second MAG side; and sending, by the SDN controller, a fourth establishment message to the LMA, wherein the fourth establishment message is used to instruct the LMA to establish a tunnel interface on the LMA side, and the fourth establishment message comprises configuration information for establishing the tunnel interface on the LMA side; and wherein sending the message for adjusting the flow entry of the mobile node further comprises:

sending, by the SDN controller, a third adjustment message to the second MAG, wherein the third adjustment message is used to instruct the second MAG to add a third flow entry of the mobile node; and sending, by the SDN controller, a fourth adjustment message to the LMA, wherein the fourth adjustment message is used to instruct the LMA to add a fourth flow entry of the mobile node.

20. The method according to claim 19, wherein the third flow entry is used to instruct the second MAG to forward data according to content of the third flow entry; and wherein the fourth flow entry is used to instruct the LMA to forward data according to content of the fourth flow entry.

* * * * *